(12) United States Patent
Eliasmith et al.

(10) Patent No.: US 9,904,889 B2
(45) Date of Patent: Feb. 27, 2018

(54) METHODS AND SYSTEMS FOR ARTIFICIAL COGNITION

(71) Applicant: APPLIED BRAIN RESEARCH INC, Waterloo (CA)

(72) Inventors: Christopher David Eliasmith, Waterloo (CA); Terrence Charles Stewart, Waterloo (CA); Feng-Xuan Choo, Waterloo (CA); Trevor William Bekolay, Waterloo (CA); Travis Crncich-DeWolf, Waterloo (CA); Yichuan Tang, Mississauga (CA); Daniel Halden Rasmussen, Waterloo (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 1044 days.

(21) Appl. No.: 14/094,142

(22) Filed: Dec. 2, 2013

(65) Prior Publication Data
US 2014/0156577 A1 Jun. 5, 2014

Related U.S. Application Data

(60) Provisional application No. 61/733,771, filed on Dec. 5, 2012.

(51) Int. Cl.
*G06N 3/063* (2006.01)
*G06N 3/08* (2006.01)
(Continued)

(52) U.S. Cl.
CPC .............. *G06N 3/08* (2013.01); *G06N 3/049* (2013.01); *G06N 3/10* (2013.01); *G06N 99/005* (2013.01)

(58) Field of Classification Search
None
See application file for complete search history.

(56) References Cited

U.S. PATENT DOCUMENTS 4,874,963 A  10/1989 Kispector
5,327,522 A   7/1994 Furuta et al.
(Continued)

FOREIGN PATENT DOCUMENTS

EP       2437205 A1    4/2012
WO    2006050142 A2    5/2006
(Continued)

OTHER PUBLICATIONS

Stewart et al, "Spaun: a perception-cognition-action model using spiking neurons," Proceedings of the 34th Annual Meeting of the Cognitive Science Society (COGSCI '12), pp. 1018-1023, Aug. 1, 2012.*

(Continued)

*Primary Examiner* — Kakali Chaki
*Assistant Examiner* — Fuming Wu
(74) *Attorney, Agent, or Firm* — Bereskin & Parr LLP/S.E.N.C.R.L., s.r.l.

(57) ABSTRACT

Methods, systems and apparatus that provide for perceptual, cognitive, and motor behaviors in an integrated system implemented using neural architectures. Components of the system communicate using artificial neurons that implement neural networks. The connections between these networks form representations—referred to as semantic pointers—which model the various firing patterns of biological neural network connections. Semantic pointers can be thought of as elements of a neural vector space, and can implement a form of abstraction level filtering or compression, in which high-
(Continued)

dimensional structures can be abstracted one or more times thereby reducing the number of dimensions needed to represent a particular structure.

14 Claims, 20 Drawing Sheets

(51) Int. Cl.
*G06N 3/04* (2006.01)
*G06N 3/10* (2006.01)
*G06N 99/00* (2010.01)

(56) References Cited

U.S. PATENT DOCUMENTS

| | | | |
|---|---|---|---|
| 5,515,477 A * | 5/1996 | Sutherland | G06K 9/6232 128/925 |
| 5,592,589 A | 1/1997 | Poon | |
| 6,009,418 A | 12/1999 | Cooper | |
| 6,167,390 A | 12/2000 | Brady et al. | |
| 6,601,049 B1 | 7/2003 | Cooper | |
| 6,654,730 B1 | 11/2003 | Kato et al. | |
| 6,937,767 B1 * | 8/2005 | Burak | G06T 9/007 375/E7.04 |
| 7,143,072 B2 | 11/2006 | Masgonty et al. | |
| 7,287,014 B2 | 10/2007 | Chen et al. | |
| 7,395,251 B2 | 7/2008 | Linsker | |
| 7,496,546 B2 | 2/2009 | Hoya | |
| 7,502,766 B2 | 3/2009 | Dodgson | |
| 7,613,663 B1 | 11/2009 | Commons et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,739,208 B2 | 6/2010 | George et al. | |
| 7,818,273 B2 | 10/2010 | Ananthanarayanan et al. | |
| 7,908,235 B2 | 3/2011 | Snook et al. | |
| 7,937,342 B2 | 5/2011 | George et al. | |
| 7,984,005 B2 | 7/2011 | Bridges et al. | |
| 8,005,773 B2 | 8/2011 | Ananthanarayanan et al. | |
| 8,015,130 B2 | 9/2011 | Matsugu et al. | |
| 8,023,046 B2 | 9/2011 | Lazar et al. | |
| 8,159,373 B2 | 4/2012 | Markram | |
| 8,180,633 B2 | 5/2012 | Collobert et al. | |
| 8,219,507 B2 | 7/2012 | Jaros et al. | |
| 8,253,607 B2 | 8/2012 | Markram | |
| 9,015,093 B1 * | 4/2015 | Commons | G01C 21/3602 701/23 |
| 2002/0006204 A1 * | 1/2002 | England | G06F 21/10 380/269 |
| 2003/0140020 A1 | 7/2003 | Chen et al. | |
| 2004/0193559 A1 | 9/2004 | Hoya | |
| 2004/0220891 A1 | 11/2004 | Dodgson | |
| 2005/0093857 A1 * | 5/2005 | Wang | G06T 15/04 345/419 |
| 2005/0278362 A1 | 12/2005 | Maren et al. | |
| 2006/0184462 A1 | 8/2006 | Hawkins | |
| 2007/0192267 A1 | 8/2007 | Hawkins et al. | |
| 2007/0192268 A1 | 8/2007 | Hawkins et al. | |
| 2007/0192271 A1 | 8/2007 | George et al. | |
| 2008/0059389 A1 | 3/2008 | Jaros et al. | |
| 2008/0201286 A1 | 8/2008 | Hawkins et al. | |
| 2008/0208783 A1 | 8/2008 | Jaros et al. | |
| 2008/0208966 A1 | 8/2008 | Edwards et al. | |
| 2009/0105958 A1 * | 4/2009 | Thodberg | A61B 6/505 702/19 |
| 2009/0116413 A1 | 5/2009 | George | |
| 2009/0177651 A1 * | 7/2009 | Takamatsu | G06F 17/30867 |
| 2009/0210363 A1 * | 8/2009 | Grabarnik | G06K 9/6247 706/12 |
| 2009/0216347 A1 | 8/2009 | Mahfouf et al. | |
| 2009/0254502 A1 | 10/2009 | Achler | |
| 2009/0240639 A1 | 11/2009 | George et al. | |
| 2009/0287624 A1 | 11/2009 | Rouat et al. | |
| 2009/0313193 A1 | 12/2009 | Hawkins et al. | |
| 2010/0088263 A1 | 4/2010 | Deco et al. | |
| 2010/0198765 A1 | 5/2010 | Fiorillo | |
| 2010/0185567 A1 | 7/2010 | Niemasik et al. | |
| 2010/0191684 A1 | 7/2010 | George et al. | |
| 2010/0217435 A1 * | 8/2010 | Rodemann | B25J 13/003 700/245 |
| 2010/0225824 A1 | 9/2010 | Lazar et al. | |
| 2010/0235310 A1 | 9/2010 | Gage et al. | |
| 2010/0312730 A1 | 12/2010 | Weng et al. | |
| 2010/0312731 A1 | 12/2010 | Knoblauch | |
| 2011/0025532 A1 | 2/2011 | Markram | |
| 2012/0023051 A1 | 1/2012 | Pishehvar et al. | |
| 2012/0117012 A1 | 5/2012 | Szátmary et al. | |
| 2012/0197823 A1 | 8/2012 | Hawkins et al. | |
| 2014/0156577 A1 * | 6/2014 | Eliasmith | G06N 3/049 706/25 |
| 2015/0078655 A1 * | 3/2015 | Lu | G06K 9/6256 382/159 |

FOREIGN PATENT DOCUMENTS

| | | |
|---|---|---|
| WO | 2006063291 A2 | 6/2006 |
| WO | 2007071070 A1 | 6/2007 |
| WO | 2007137047 A2 | 11/2007 |
| WO | 2009006231 A1 | 1/2009 |
| WO | 2009117224 A1 | 12/2009 |

OTHER PUBLICATIONS

Stewart et al., "Learning to select actions with spiking neurons in the basal ganglia," Frontiers in Neuroscience, vol. 6, article 2, 14 pages, Jan. 2012.*
Ivanov et al., "Developmental Learning of Memory-Based Perceptual Models", Proceedings, the 2nd International Conference on Development and Learning (ICDL'02), 7 pp. 2002.*
Kerschen et al., "Feature extraction using auto-associative neural networks," Smart Mater. Struct. 13 (2004), pp. 211-219, 2004.*
Center for Theoretical Neuroscience, "Nengo Documentation (Release 1.3)," University of Waterloo, Sep. 12, 2011.*
Ivanov et al., "Developmental Learning of Memory-Based Perceptual Models", Proceedings, the 2nd International Conference on Development and Learning (ICDL?02), 7 pp. 2002.*
Todd et al., "A sensorimotor theory of temporal tracking and beat induction", Psychological Research (2002) 66: 26-39, 2002.*
Rowies et al., "Nonlinear Dimensionality Reduction by Locally Linear Embedding," Science vol. 290, pp. 2323-2326, Dec. 22, 2000.*
Extended European Search Report issued on European Application No. 13195901.7, dated Mar. 18, 2014.
Eliasmith, Chris "How to build a brain: A neural architecture for biological cognition". Oxford University Press, Sep. 4, 2012.
Eliasmith et al. "A large-scale model of the functioning brain" science 338.6111, Nov. 30, 2012, 1202-1205.
Eliasmiti-1 et al. "A large-scale model of the functioning brain—Supplemental material". (2013) Available: https://cs.uwaterloo.ca/~cdimarco/pdf/cogsci600/Eliasmith2013b.pdf.
Furber et al., "Neural systems engineering." Journal of the Royal Society Interface 4, No. 13 (2007), pp. 193-209.
T.C. Stewart et al., "Spaun: a perception-cognition-action model using spiking neurons", Proceedings of the 34th Annual Meeting of the Cognitive Science Society (COGSCI'12), Aug. 1, 2012, pp. 1018-1023 (XP055106246). Available Online: compneuro.uwaterloo.ca/files/publications/stewart.2012c.pdf.
B. Tripp et al., "Nengo documentation : release 1.3", Centre for Theoretical Neuroscience (CTN) at University of Waterloo, Sep. 27, 2012 (XP055106260). Available Online: nengo.ca/docs/latex/Nengo.pdf.
Y. Wu, "In search of lost time: a computational model of the representations and dynamics of episodic memory", Thesis for Master of Applied Science at University of Waterloo, May 14, 2012 (XP055106269) *Abstract*. Available Online: compneuro.uwaterloo.ca/publications/wu2012.html.
T. Bekolay, "Learning in large-scale spiking neural networks", Thesis for Master of Mathematics at University of Waterloo, 2011

(56) References Cited

OTHER PUBLICATIONS (XP055106270) *Abstract*. Available Online: compneuro.uwaterloo.ca/files/publications/bekolay.2011a.pdf.
B. Bobier, "The attentional routing circuit: a neural model of attentional modulation and control of functional connectivity", Thesis for Doctor of Philosophy at University of Waterloo, 2011 (XP055106271) *Abstract*. Available Online: https://uwspace.uwaterloo.ca/handle/10012/6122.
F.-X. Choo, "The ordinal serial encoding model: serial memory in spiking neurons", Thesis for Master of Mathematics at University of Waterloo, 2010 (XP055106273) *Abstract*. Available Online: compneuro.uwaterloo.ca/files/publications/choo.2010.pdf.
Y. Tang, "Robust visual recognition using multilayer generative neural networks", Thesis for Master of Mathematics at University of Waterloo, 2010 (XP055106275) *Abstract*. Available Online: compneuro.uwaterloo.ca/files/publications/tang.2010a.pdf.
D. Rasmussen, "A neural modelling approach to investigating general intelligence", Thesis for Master of Mathematics at University of Waterloo, 2010 (XP055106277) *Abstract*. Available Online: compneuro.uwaterloo.ca/files/publications/rasmussen.2010a.pdf.
T. DeWolf, "NOCH: a framework for biologically plausible models of neural motor control", Thesis for Master of Mathematics at University of Waterloo, 2010 (XP055106281) *Abstract*. Available Online: compneuro.uwaterloo.ca/files/publications/dewolf.2010a.pdf.
B. Tripp, "A search for principles of basal ganglia function", Thesis for Doctor of Philosophy at University of Waterloo, 2008 (XP055106279) *Abstract*. Available Online: compneuro.uwaterloo.ca/files/publications/tripp.2009.pdf.

\* cited by examiner

METHODS AND SYSTEMS FOR ARTIFICIAL COGNITION

This application claims the benefit of U.S. Provisional Application No. 61/733,771 filed Dec. 5, 2012.

FIELD

The described embodiments relate to machine intelligence and, more particularly, to machine intelligence with artificial cognitive abilities.

BACKGROUND

There are two primary approaches to constructing models of the human or mammalian brain. A first approach, known as connectionism, consists of constructing interconnected networks of simple elements, and is commonly demonstrated in artificial neural networks. A second approach, known as symbolicism, consists of implementing symbolic logic, and can be found in many industrial systems. Connectionist models effectively implement simple sensory processing; however, to date they have been capable of only limited cognitive processing.

Within the connectionist approach, a central challenge is to relate the incredibly complex behavior of animals to the equally complex activity of their brains. Often the neural elements in these models are not very similar to biological neurons. In other cases, they are quite similar; and may include spiking and other neural dynamics. In both cases, current large-scale neural models have not bridged the gap between neural network activity and biological equivalent function.

Current large-scale models include the Blue Brain Project, which has simulated about a million neurons in cortical columns, and includes significant biological detail accurately reflecting spatial structure, connectivity statistics, and other neural properties. More recent work has simulated many more neurons, such as the Cognitive Computation project, which has simulated one billion neurons.

While impressive scaling has been achieved, no large-scale spiking (or non-spiking) neuron models have demonstrated how such simulations connect to the behavior-switching flexibility of biological systems observable in nature. Unfortunately, simulating a complex brain alone does not explain how complex brain activity generates complex behavior.

SUMMARY

In a first broad aspect, some embodiments provide an artificial intelligence system comprising: at least one interface hierarchy configured to receive an input of a high-dimensional representation and to compress the high-dimensional representation to generate a lower-dimensional representation of the input; at least one processing module configured to receive the lower-dimensional representation and to generate a further representation; an action selection controller configured to control communication of the lower-dimensional representation and the further representation between the at least one interface hierarchy and the at least one processing module.

In some cases, an additional interface hierarchy may be configured to decompress the further representation to generate an additional high-dimensional representation, the additional high-dimensional representation usable to produce an output.

At least one hierarchy may be implemented using a neural network. At least one processing module may be implemented using a neural network. The action selection controller may be implemented using a neural network. Each neural network may be a spiking neural network.

In some cases, the system further comprises at least one control point, wherein the action selection controller controls communication by modulating the at least one control point.

The at least one hierarchy may comprise one or more modules selected from the list consisting of a visual input module, a working memory module and a motor output module.

The at least one processing module may comprise one or more modules selected from the list consisting of an information encoding module, a transform calculation module, a reward evaluation module, an information decoding module and a motor processing module.

The action selection controller may comprise one or more hierarchical processing networks. The one or more hierarchical processing networks may have functions analogous to at least one anatomical structure of mammalian basal ganglia. The at least one anatomical structure may be selected from the group consisting of striatum, subthalmic nucleus, ventral striatum, globus pallidus externus, globus pallidus internus, substantia nigra pars reticulate, substantia nigra pars compacta, and ventral tegmental area.

In another broad aspect, some embodiments provide an artificial intelligence system comprising: at least one perceptual module configured to compress input received by the system to generate an internal representation; at least one cortical module configured to process the internal representation; and an action selection controller configured to coordinate communication of the internal representation between the at least one perceptual module, the at least one cortical module and the at least one output module. The system may further comprise at least one output module configured to decompress the transformed internal representation.

The at least one perceptual module may be further configured to decompress the internal representation. The at least one output module may be further configured to compress the internal representation.

Each of the at least one perceptual module, the at least one cortical module, the at least one output module and the action selection controller may be composed of spiking or non-spiking artificial neurons.

The internal representation may be a semantic pointer representation.

The at least one cortical module may process the internal representation using superposition and a compression operator, wherein the compression operator is selected from the group consisting of: circular convolution, element-wise multiplication, principle component extraction, and learned operators.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
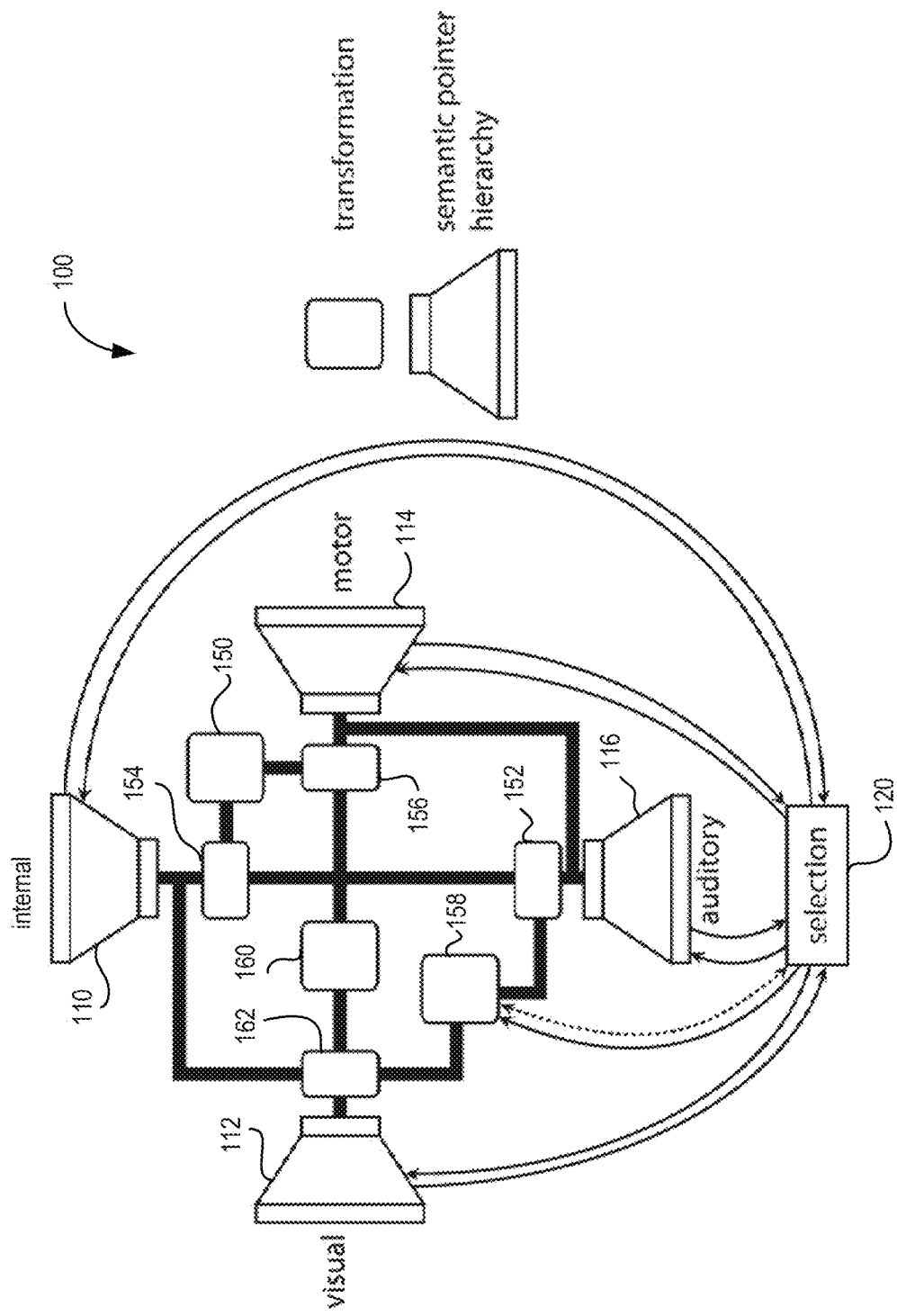
FIG. 1 is a block diagram of an artificial intelligence (AI) system in accordance with an example embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

The described embodiments are methods, systems and apparatus that generally provide for perceptual, cognitive, and motor behaviors in an integrated system implemented using neural architectures.

Components of the system can perform processing, and communicate, using artificial neurons that implement neural networks. In some cases, non-neural data may also be communicated without the use of artificial neurons. In some cases, one or more components may be implemented without the use of artificial neurons (e.g., motor controls in some embodiments). In the example embodiments presented herein, the artificial neurons are spiking, although non-spiking may also be used. The connections between these networks can be used to compute "semantic pointers", which model compressed representations of the activity of neural networks. Semantic pointers are vector representations that can be thought of as elements of a neural vector space, and can implement a form of abstraction level filtering or "compression", in which high-dimensional structures can be abstracted one or more times thereby reducing the number of dimensions needed to represent a particular structure. Semantic pointers can also exist independently of the connections between networks, and can be used to represent general information other than the firing patterns between neural networks.

Demonstrations of one example working embodiment carrying out several of the tasks described herein may be found at the URL <http://www.nengo.ca/build-a-brain/spaunvideos>.

For example, an image of the numeral "2" to be processed may be input as a 28×28 matrix of pixels. This image is at first represented as a 784-dimensional vector. Through the use of semantic pointers, the underlying features of the image can be abstracted from the original data, retaining a meaningful representation of the numeral depicted in the physical image while requiring significantly less dimensions. For example, 50 dimensions may be used to represent underlying conceptual features of the image such as the concept of a "numeral", the concept of the number "2", idiosyncratic concepts of "cursive script" as opposed to typewritten characters, etc.

Such abstraction or compression is a natural way to understand much of neural processing. For instance, the number of cells in the human brain's visual processing hierarchy gradually decreases as from primary visual cortex→secondary visual cortex→extrastriate visual cortex- →inferior temporal cortex. This means that the information has been abstracted ("compressed") one or more times from a higher-dimensional space into a lower-dimensional (feature) space. Lower-dimensional spaces are semantic pointers to the higher-dimensional space that allow reconstruction ("decompression") of a higher-dimensional space from the lower-dimensional space. The same kind of hierarchical compression operation is consistent with the known structure of the human brain's motor hierarchy, where lower-dimensional firing patterns are successively "decompressed", for example, when a lower-dimensional motor representation in Euclidean space moves down the motor hierarchy to a higher-dimensional muscle space.

Compression is functionally useful because low-dimensional representations can be more efficiently manipulated for a variety of neural computations. Consequently, learning or defining different compression and/or decompression operations provides a means of generating neural representations well-suited to a variety of functional neural computations.

In one example embodiment implementing a simplified artificial intelligence system, where the system is capable of identifying a numeral provided as visual input and driving a simulated arm to draw a facsimile of the identified numeral, the selected compression hierarchies include:

1. a visual hierarchy module, which compresses image input into lower-dimensional firing patterns;
2. a motor hierarchy module that decompresses firing patterns in a low-dimensional space to higher-dimensional space to drive a simulated arm; and,
3. a working memory module, which constructs compressed firing patterns to store serial position information.

The working memory module also includes several components that are capable of providing stable representations of intermediate task states, task sub-goals, and context. Stable representations are those that maintain an internal value or state in a network when not actively provided with further input. For example, attractor networks may be used, as described in C. Eliasmith, "A unified approach to building and controlling spiking attractor networks", *Neural computation* 17(6), pp. 1276-1314 (2005), the entire contents of which is incorporated herein by reference.

Coordination between the various hierarchies is performed by an action selection controller, which is based on a detailed human basal ganglia model and extended to process higher-dimensional neural representations. The action selection controller determines which state the system should be in, switching as appropriate in accordance with the current task goals. Consequently, the model's functional states are not hardwired, as the action selection controller is able to control the order of operations by changing information flow between subsystems, as described herein in greater detail.

Figure 3A:
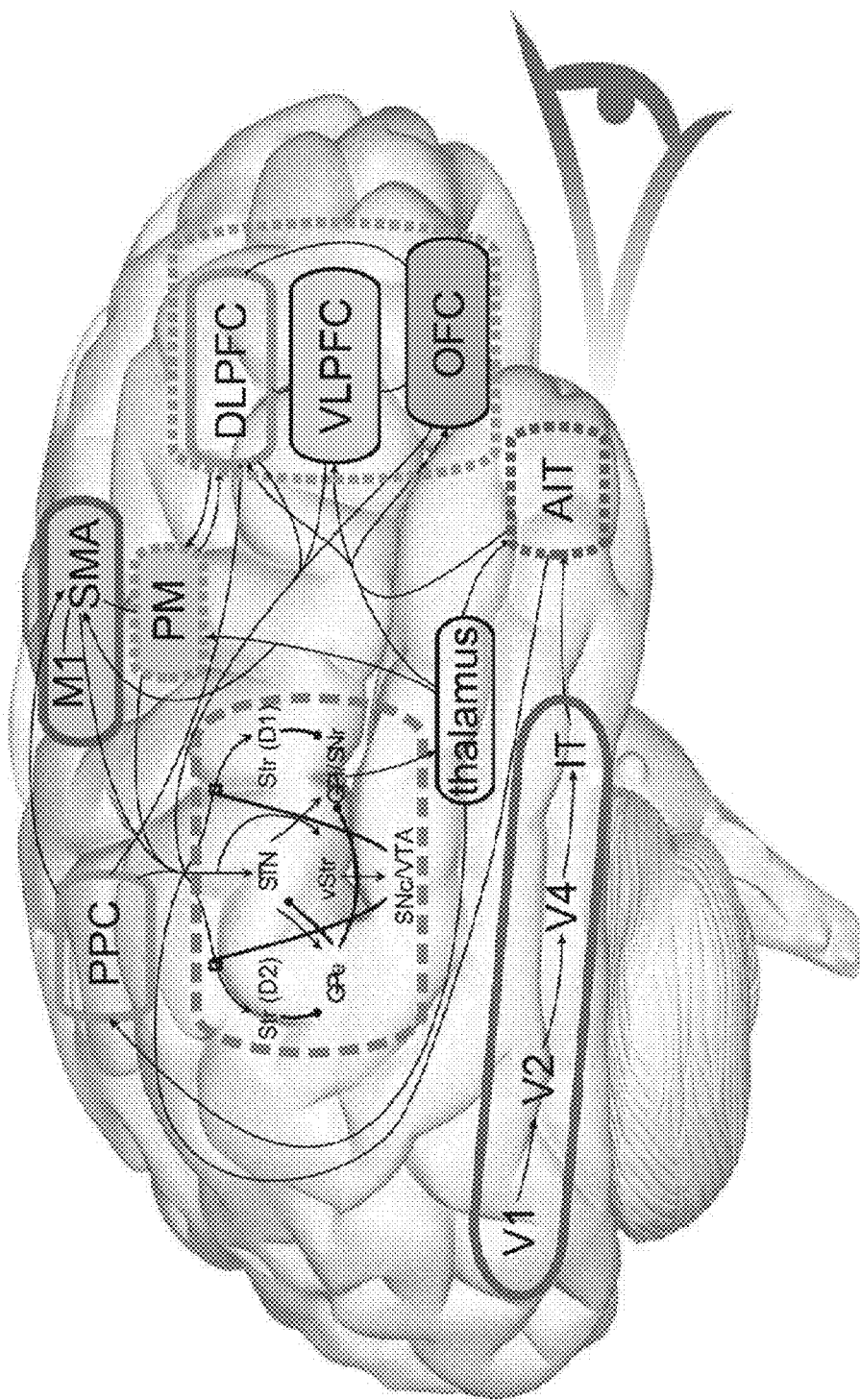
FIG. 3A is a functional schematic of the brain's anatomy.
Figure 3B:
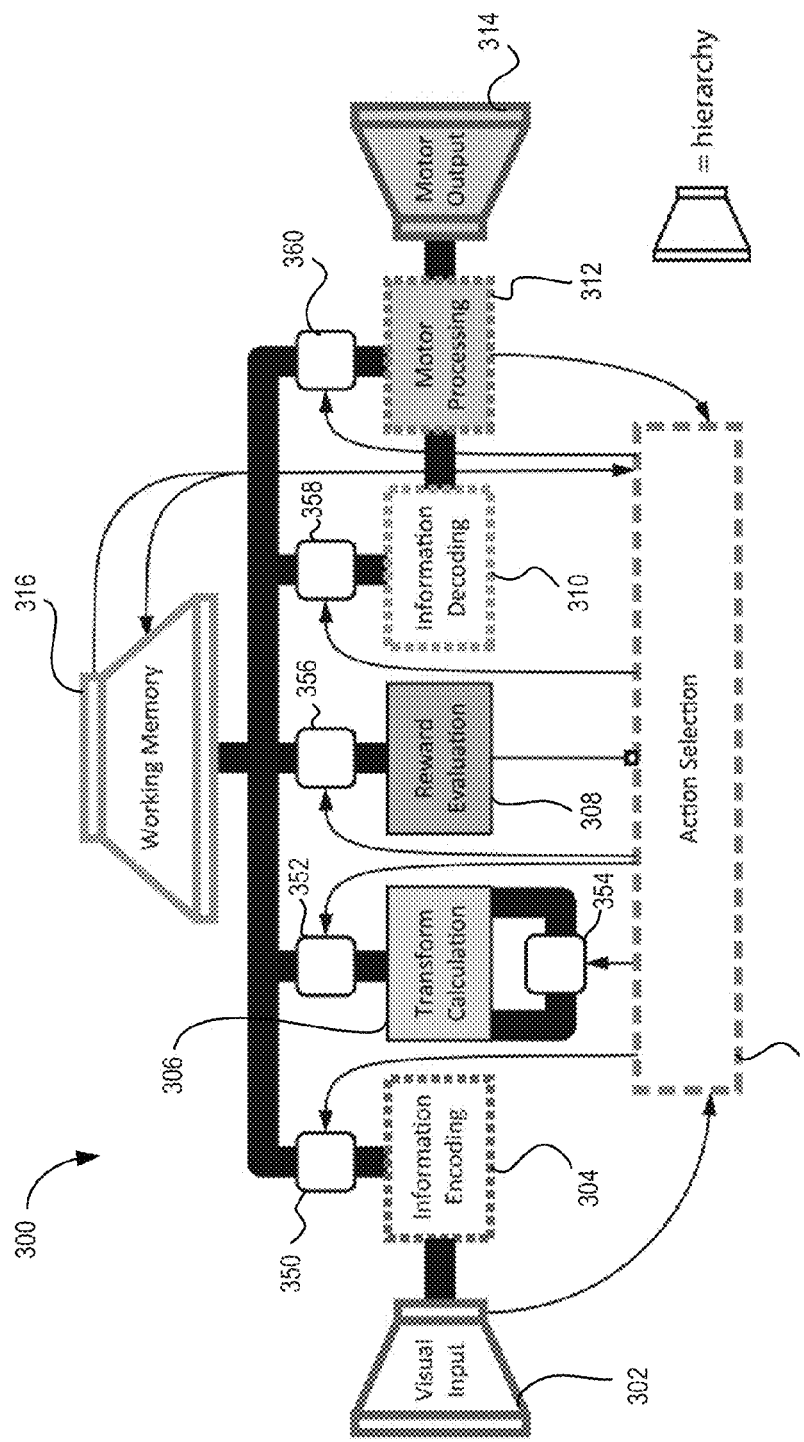
FIG. 3B is a simplified block diagram of an example system embodiment modeled on the brain of FIG. 3A.

In another example embodiment, described further with respect to FIG. 3B, additional subsystems are introduced to add or enhance specific capabilities. For example:

1. an information encoding subsystem, which maps the visual hierarchy firing pattern to a conceptual firing pattern as needed;
2. a transformation calculation subsystem, which extracts relations between semantic pointers presented as input;
3. a reward evaluation subsystem, which evaluates the reward associated with the recognized semantic pointer input;
4. an information decoding subsystem, which decompresses firing patterns from memory to conceptual firing patterns; and
5. a motor processing subsystem, which maps conceptual firing patterns to motor firing patterns and controls motor timing.

Accordingly, in one example system embodiment, there are included three compression hierarchy modules, an action selection controller, and five functional subsystems. It will be appreciated that the number of compression hierarchies and subsystems can be varied as needed.

Referring now to FIG. 1, there is illustrated a block diagram of an artificial intelligence (AI) system in accordance with an example embodiment. System 100 illustrates a schema that captures the general organizational structure of the described embodiments. For convenience, the organization structure is referred to herein as the Semantic Pointer Architecture (SPA). Not all embodiments implementing SPA need to have the same components.

System 100 includes a visual hierarchy module 112, an auditory hierarchy module 116, a motor hierarchy module 114 and an internal hierarchy module 110 (which can implement functions like a working memory and encoding of conceptual hierarchies). System 100 further includes an action selection module 120 and one or more subsystems 150, 152, 154, 156, 158, 160 and 162. Each of the subsystems 150 to 162 can be implemented as needed.

Thick black lines are used to indicate connections that communicate vector representations between parts of the system 100. Conversely, thin lines indicate control signals, with dotted thin lines indicating error signals. It will be appreciated that, for ease of illustration, not all information flow is depicted in FIG. 1. For example, information flow within each module or subsystem, which is that between artificial neurons, is not depicted.

Figure 2:
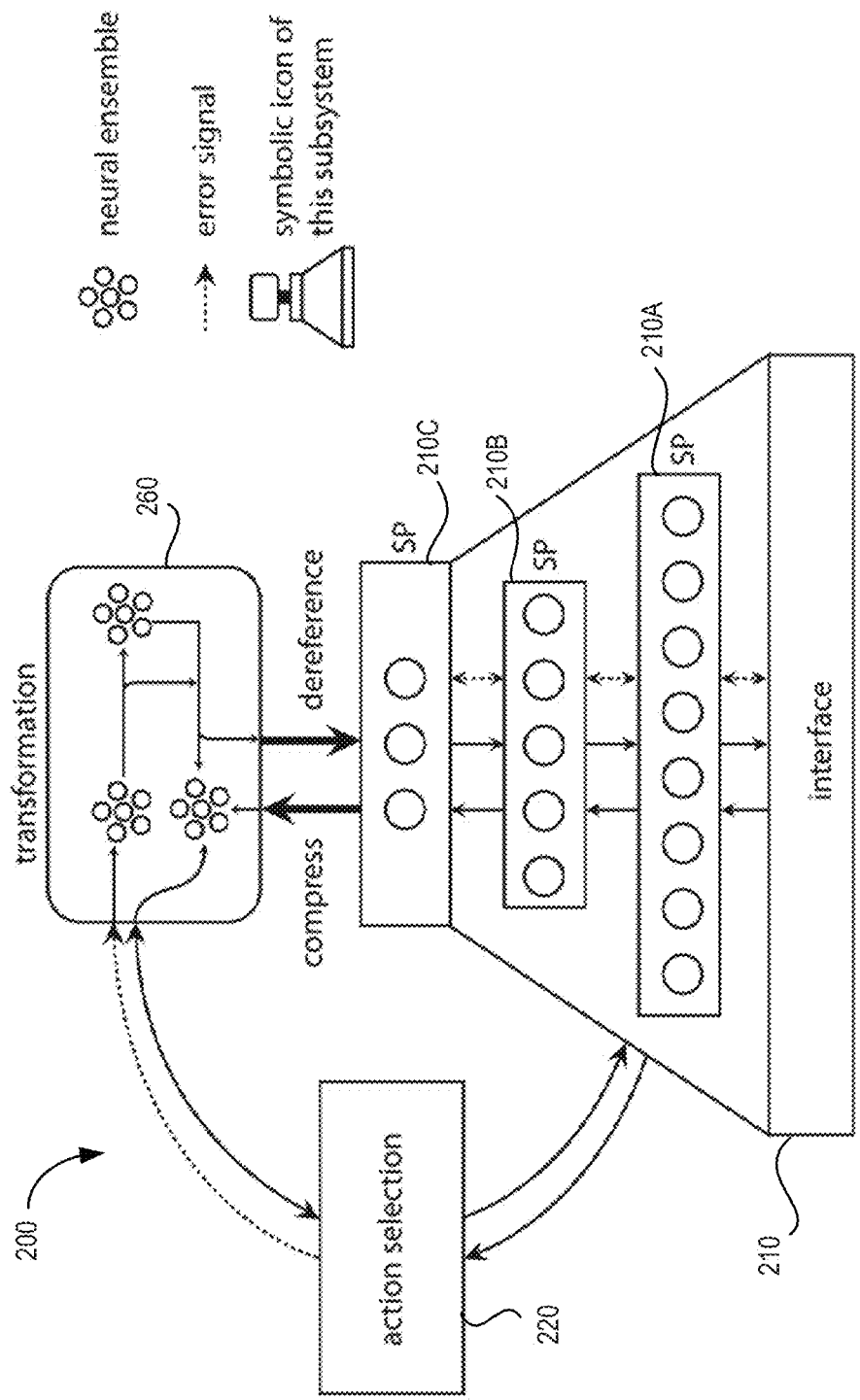
FIG. 2 is a simplified block diagram of a portion of an AI system, such as system 100 of FIG. 1.

Referring now to FIG. 2, there is illustrated a simplified block diagram of a portion of an SPA system, such as system 100 of FIG. 1. Simplified system 200 includes only a single interface hierarchy module 210, a transformation subsystem 260 and an action selection controller 220.

The specific particulars of interface hierarchy module 210 and transformation subsystem 260 will depend on the specific area of the brain and function intended to be emulated by system 200. For example, the number of levels in the hierarchy module, the nature of the transformations, the kinds of control, the flow of error information and other details depend on whether we are considering vision, audition, motor control, working memory, or more abstract functions. Regardless, system 200 serves as a useful example to illustrate linking of subsystems into a larger system, such as system 100 in FIG. 1.

Interface hierarchy module 210 generally interfaces with the environment—or another subsystem—and initially generates a high-dimensional representation of semantic pointer (SP) 210A. Semantic pointers make up many of the signals processed by the SPA. Semantic pointer 210A is processed through a hierarchical structure neural network structure, with each level of the hierarchy generating semantic pointers (in this case 210B and 210C). Generally, when moving up one or more levels in the hierarchy, for each additional level of hierarchy away from the environmental interface (e.g., visual input, motor output, etc.), the number of dimensions needed for the SP representation is successively reduced in a compression operation at each level. Conversely, moving down one or more levels in the hierarchy successively decompresses or "dereferences" the semantic pointer representations at each level.

At all levels of the hierarchy, the generated semantic pointers can be extracted and transformed by subsystem 260 or any other subsystem that may be available. Each level of the hierarchy may itself perform a transformation, in addition to basic compression or decompression. Subsystem 260 can apply a predefined or learned transformation to the semantic pointer and return a transformed semantic pointer representation to module 210 or any other module or subsystem, as needed. The specific transformation to be applied may vary from very simple "building blocks" used in a variety of operations, such as an "information encoding" function described herein to high-level processing transformations, such as a Fast Fourier Transform, for example.

All such transformations are updateable by error signals, which may come from the action selection component, or which may be internally generated. Error signals generally guide the learning of the transformation modules between two populations. Most often this may facilitate adjusting the connection weights between neurons within each module, but error signals may also be applied to adjust transformations at the level of the semantic pointers.

Error signals themselves can be generated externally or internally. External error signals are those that provide feedback from the environment to the system about the error in its responses. Internal error signals are those that are generated within the system by observing the results of its actions, calculating an error between an actual result and the desired result, and using that error internally generated error to guide learning. One example of the use of error signals is in a "bandit" task (e.g., modeled on the "one-armed bandit" casino machine) where the system can learn to choose an option, out of a set of available choices, that results in what is anticipated to produce the highest immediate reward based on past history.

Action selection controller 220 influences routing of information throughout the system 200.

Systems 100 and 200 describe in a general form how the SPA and semantic pointers can be used to provide neural systems capable of representing, transforming, transferring, and controlling the flow of information.

In general, the underlying hypothesis in the SPA approach is that higher-level cognitive functions in biological systems are made possible by semantic pointers. Semantic pointers are neural representations that carry partial semantic content and are composable into the representational structures necessary to support complex cognition.

In order to implement the semantic pointer approach, first we must indicate how semantic information is captured by the representations that we identify as semantic pointers. Second, we must give a characterization of how to construct "representational structures"; that is, account for syntax given those representations.

There have been a wide variety of proposals regarding the role that semantics and syntax should play in theories of cognition. Traditionally, a classical cognitive system is characterized as a symbol processing system that relies on syntax to respect the semantics of the symbols and combinations of symbols found in the system (i.e., the symbolic approach). Conversely, in connectionist approaches, semantics has been a focus, where the vector space defined by the activity of the nodes in the network is often thought of as a "semantic space" that related the meaning of different firing patterns.

However, in the SPA described herein, both syntax and semantics are implemented in the same biologically plausible construct. That is, both syntactical elements and symbolic elements can be represented using semantic pointer representations.

The SPA approach is generally implemented with artificial neurons that mimic several features of their biological counterparts. In particular, the artificial neurons are characterized by one or more inputs (dendrites), a body that fires or "spikes" according to a learned or trained set of conditions (soma), and one or more outputs (axons). The artificial neurons are formed into networks of neurons with interconnections with varying weights, which can be regulated to disinhibit (that is, allow) communication between neurons or to inhibit such communication, as is the case in their biological counterparts. In general, the artificial neurons are responsive to control signals that approximate the functions of neurochemicals.

Various spiking and non-spiking neuron models may be used, and even non-neuronal models may be adapted for use with the described systems and methods. In one example embodiment, a "Leaky Integrate and Fire" spiking neuron model is used, as described, for example, by R. B. Stein, "Some models of neuronal variability", *Biophysical Journal* 7(1), pp. 37-68 (1967), the entire contents of which is incorporated herein by reference. Both the Leaky Integrate and Fire model and other neuronal models can be adapted for use with the described embodiments using a neural engineering framework, as described for example by C. Eliasmith, C. H. Anderson, *Neural engineering: Computation, representation and dynamics in neurobiological systems* (MIT Press, Cambridge, Mass., 2003), the entire contents of which are hereby incorporated by reference. Neural models may be simulated using a suitable neural simulator, such as the Nengo neural simulator (<http://www.nengo.ca/>).

The use of neural connection weights ("synaptic weights") allows the computation of particular functions, where inputs and outputs can be expressed as vectors. The neural connection weights can be learned with a biologically plausible spike-based rule as described by D. MacNeil, C. Eliasmith, *PLoS ONE* 6(9), e22885, doi:10.1371/journal.pone.0022885 (2011), the entire contents of which are hereby incorporated by reference. In at least some embodiments, other more efficient optimization methods can be used to determine the synaptic weights.

For example, connection weights can be learned through local methods (including, but not limited to, spike-timing-dependent plasticity, or any other form of Hebbian learning) and, global optimization methods (including, but not limited to, singular value decomposition).

As noted above, semantic pointers can be described as vectors in a high-dimensional space. In general, however, the high-dimensional space must be compact enough for efficient manipulation. Accordingly, the Semantic Pointer Architecture employs the notion of a "pointer."

One notable feature of pointers in conventional computer science is that a pointer itself and the information contained at its address are arbitrarily related. As a result, having the pointer itself often indicates nothing about what sort of information will be found when the address to which it points is accessed. Since decisions about how to use information often depends on what the content of that information is, pointers are often "dereferenced" during program execution. Dereferencing occurs when the data at the address specified by the pointer is accessed. In a conventional computer, this is a relatively cheap operation because memory is highly structured, and the pointer is easy to interpret as an address.

Given these features, pointers are reminiscent of symbols. Symbols gain their computational utility from the arbitrary relationship they hold with their contents. And, symbols are often thought to act like labels for more sophisticated data structures (such as schemas, scripts, etc.), just as pointers act as labels for whatever happens to be at their address.

The semantic pointer hypothesis suggests that neural representations implicated in cognitive processing share central features with this traditional notion of a pointer. In short, the hypothesis suggests that the brain manipulates compact, address-like representations to take advantage of the significant efficiency and flexibility afforded by such representations. Relatedly, such neural representations are able to act like symbols in the brain.

As an example, a neural representation at the top of the visual hierarchy (i.e., once abstracted through one or more hierarchical levels) would be a semantic pointer that points to the many lower-level visual properties of an image previously encoded elsewhere in the artificial brain. It points to these precisely because the semantic pointer itself does not explicitly contain representations of those properties, but it can be used to recall and re-activate those lower level representations through feedback connections. This relation between a semantic pointer and what it points to can be usefully thought of as a kind of compression.

However, the arbitrary relationship between a pointer and its contents is problematic for biological systems, because relationships between neural representations are most often learned. Consequently, the semantic pointer hypothesis is an extension of the standard notion of a pointer. In particular, the "semantic" in "semantic pointer" refers to the fact that the representations that play the role of a pointer contain semantic information themselves. That is, the relationship between a semantic pointer and the more sophisticated data structure to which it points is not completely arbitrary. Specifically, the semantic information that is contained in a semantic pointer is usefully thought of as a compressed version of the information contained in a more complex representation.

In short, semantic pointers are neural representations that are aptly described by high-dimensional vectors, are typically generated by compressing higher-dimensional representations, and can be used to access those more sophisticated representations through decompression (a kind of dereferencing). This kind of representation and the operations to manipulate such representations are implemented in the described systems and methods.

Referring now to FIGS. 3A and 3B, there is illustrated an example embodiment implementing an artificial intelligence modeled on a mammalian (human) brain. For convenience, this embodiment is referred to herein as the Semantic Pointer Architecture Unified Network (Spaun). FIG. 3A is a schematic diagram illustrating anatomical structures of the human brain including the major brain structures and their connectivity. FIG. 3B is a schematic block diagram of the Spaun system that contains elements analogous to those highlighted in FIG. 3A. Lines terminating in circles indicate connections with neurons that produce output simulating the effects of gamma-Aminobutyric acid (GABA) at their output—so-called GABAergic (inhibitory) connections or synapses. Lines terminating in open squares indicate modulatory activity emulating dopaminergic (adaptive) connections.

FIG. 3B shows the functional architecture of the example Spaun system 300. Thick black lines indicate communication between elements of cortex and thin lines indicate communication between the action selection controller 318 (analogous to basal ganglia) and cortex. Rounded boxes indicate that the action selection controller can use activity changes to manipulate the flow of information into a subsystem, that is, to gate or limit connectivity between subsystems. An open square end of the line connecting reward evaluation subsystem 308 and action selection controller 318 indicates that this connection can modulate connection weights. Modulating connection weights may involve simple enabling or disabling connections, however, modulation may further involve modifying a connection weight matrix underlying the connection. Table 1 below defines abbreviations used in FIG. 3A and summarizes the function-to-anatomy mapping in FIG. 3B.

TABLE 1

| Element | Anatomical equivalent and description |
|---|---|
| Visual input hierarchy 302 | V1—primary visual cortex: the first level of the visual hierarchy,tuned to small oriented patches of different spatial frequencies<br>V2—secondary visual cortex: pools responses from V1, representing larger spatial patterns<br>V4—extrastriate visual cortex: combines input from V2 to recognize simple geometric shapes<br>IT—inferior temporal cortex: the highest level of the visual hierarchy, representing complex objects |
| Information encoding 304 | AIT—anterior inferior temporal cortex: implicated in representing visual features for classification and conceptualization |
| Transform calculation 306 | VLPFC—ventrolateral prefrontal cortex: area involved in rule learning for pattern matching in cognitive tasks |
| Reward evaluation 308 | OFC—orbitofrontal cortex: areas involved in the representation of received reward |
| Information decoding 310 | PFC—prefrontal cortex: implicated in a wide variety of functions, including executive functions and manipulation of working memory |
| Working memory hierarchy 316 | PPC—posterior parietal cortex: involved in the temporary storage and manipulation of information, particularly visual data<br>DLPFC—dorsolateral prefrontal cortex: temporary storage and manipulation of higher level data related to cognitive control |
| Action selection hierarchy 318 | Str (D1)—striatum (D1 reward neurons): input to the "direct pathway" of the basal ganglia<br>Str (D2)—striatum (D2 reward neurons): input to the "indirect pathway" of the basal ganglia<br>STN—subthalamic nucleus: input to the "hyperdirect pathway" of the basal ganglia<br>VStr—ventral striatum: involved in the representation of expected reward in order to generate reward prediction error<br>GPE—globus pallidus externus: part of the "indirect pathway", projects to other components of the basal ganglia in order to modulate their activity<br>GPi/SNr—globus pallidus internus and substantia nigra pars reticulata: the output from the basal ganglia<br>SNc/VTA—substantia nigra pars compacta and ventral tegmental area: relay signal from ventral striatum as reward modulation to control learning in basal ganglia connections |
| Routing | Thalamus—receives output from the basal ganglia, sensory input, and coordinates/monitors interactions between cortical areas |
| Motor processing 312 | PM—premotor cortex: involved in the planning and guidance of complex movement |
| Motor output hierarchy 314 | M1—primary motor cortex: generates muscle based control signals that realize a given internal movement command<br>SMA—supplementary motor area: involved in the generation of complex movements |

Visual input hierarchy module 302 is generally modeled on the ventral visual stream of the human brain, including V1, V2, V4, and IT areas.

Accordingly, visual input hierarchy module 302 includes four hierarchical levels. A first hierarchical level serves as the primary visual cortex (V1), generating semantic pointers for small oriented patches of different spatial frequencies in an image with a high-dimensional representation. A second hierarchical level acts as the secondary visual cortex (V2), and generates semantic pointers with a relatively lower-dimensional representation that pool responses from the first level, representing larger spatial patterns. A third hierarchical level acts as the extrastriate visual cortex (V4) and combines input from the second level to recognize geometric shapes and generate semantic pointers with a still lower-dimensional representation accordingly. Finally, a fourth hierarchical level acts as inferior temporal cortex (IT) and is used to recognize complex objects and generate appropriate semantic pointers at the highest level of abstraction and lowest-dimensional representation.

In the example embodiment, module 302 is implemented using Restricted Boltzmann Machine (RBM)-based auto-encoders, which are trained on images of natural scenes and images drawn from the Modified National Institute of Standards and Technology (MNIST) handwriting database. The training can be performed as described, for example, by G. E. Hinton, R. R. Salakhutdinov, *Science* 313, no. 5786, pp. 504-507 (2006); D. H. Ackley, G. E. Hinton, T. J. Sejnowsky, "A Learning Algorithm for Boltzmann Machines", *Cognitive Science* 9, pp. 147-169 (1985); and by Y. Tang, C. Eliasmith, "Deep networks for robust visual recognition", Proceedings of the 27th International Conference on Machine Learning (2010), pp. 1055-1062, each of which is incorporated herein by this reference.

Generally speaking, the visual hierarchy can be trained using a method based on RBM, which is basically a gradient descent approach to find the weights over a neural network with hidden layers wherein the network has a fixed energy function. However, the visual hierarchy is not limited to RBM-based networks, and other techniques may also be used to provide the visual hierarchy.

Figure 5:
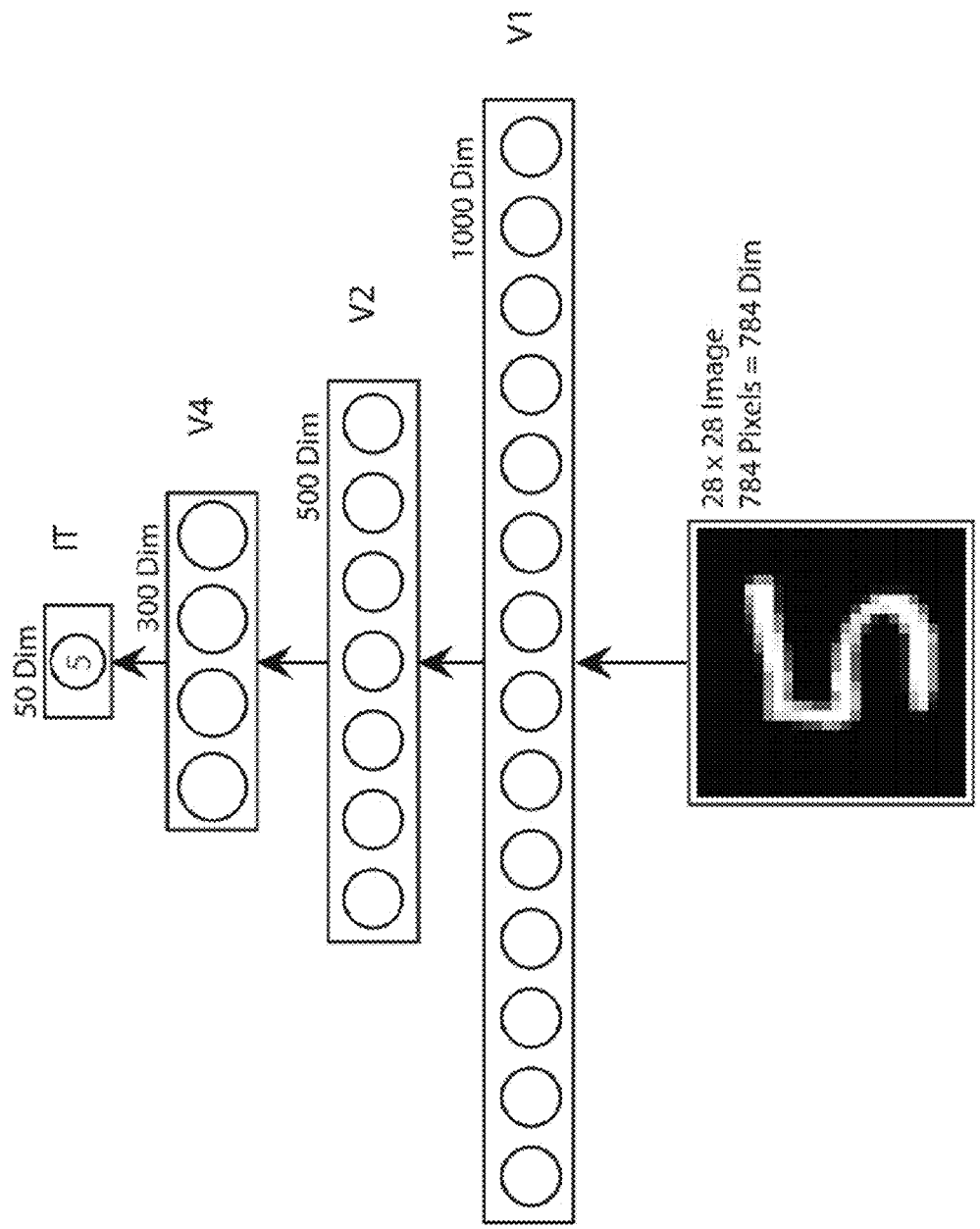
FIG. 5 is a simplified schematic diagram of the compression hierarchy.

Referring now to FIG. 5, there is illustrated a simplified schematic diagram of the compression hierarchy of the visual input hierarchy module 302 in one embodiment.

The visual compression hierarchy has a 28×28 dimensional input layer (e.g., for receiving a 784-pixel input image) and consecutive hidden layers of 1000, 500, 300 and 50 nodes.

The initial, 1000-node hierarchical layer, which generates a 1000-dimensional semantic pointer, can be considered analogous to the primary visual cortex (V1). A second, 500-node layer can be considered analogous to the secondary visual cortex (V2). A third, 300-node layer can be considered analogous to the extrastriate visual cortex (V4). Finally, a further hierarchical level can be considered analogous to the inferior temporal cortex (IT). Each hierarchical layer generally generates progressively lower-dimensional semantic pointers, with the result that a 784-dimensional representation at the input can be reduced to a 50-dimensional representation in the IT layer.

The visual compression hierarchy network learns the compression needed to reduce any input image to a 50-dimensional (50D) semantic pointer. Each of the hierarchical layers define vector spaces that can be embedded into spiking neurons using a functional neural network approach. In one preferred neural engineering framework (NEF), the connections between these layers define the vector space transformations that can be implemented in connection weights between the layers. In an example embodiment, training is performed prior to implementation. However, in other embodiments, learning and training may occur during operation. In addition, other modules and hierarchies—in particular the action selection module—may be configured to learn and train during operation (e.g., at run-time).

Referring now to FIGS. 6A to 6D, there are illustrated some example inputs and outputs from the visual compression hierarchy of FIG. 5.

Figures 6A, 6B, 6C:
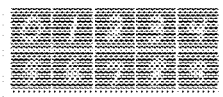
FIG. 6A is an array of original input images for a copy drawing task.
FIG. 6B is an array of generated image representations corresponding to the array of FIG. 6A.
FIG. 6C is an array of average semantic pointer representations corresponding to the task of FIGS. 6A and 6B.

FIG. 6A illustrates an array of original input images, randomly chosen and input to the hierarchy module. Each of the input images was compressed into a 50D semantic pointer representation at the highest level of the visual hierarchy.

FIG. 6B illustrates an array of images generated by dereferencing (decompressing) each of the 50D semantic pointer representations generated by the visual hierarchy module after having been shown the original images. It can be observed that the module was able to generate correct semantic pointer representations in the vast majority of input cases. It can be further observed that the generated semantic pointer representations do not necessarily correspond exactly to the input images. For example, the image input shown at row three, column eight is an image of the numeral "8" in which the interior portion of the character appears to be nearly filled indicating a bold stroke pen. Nevertheless, the semantic point representation, while identifying the character as the numeral "8" does not entirely replicate the bold stroke.

The 50D representations generated by the visual hierarchy module can be clamped at the highest-level (i.e., 50D), and the rest of the visual hierarchy used to generate a guess as to what input would produce each semantic pointer. FIG. 6C illustrates the resulting dereferenced average semantic pointer for each category. These can be thought of as a prototype of the category.

Figure 6D:
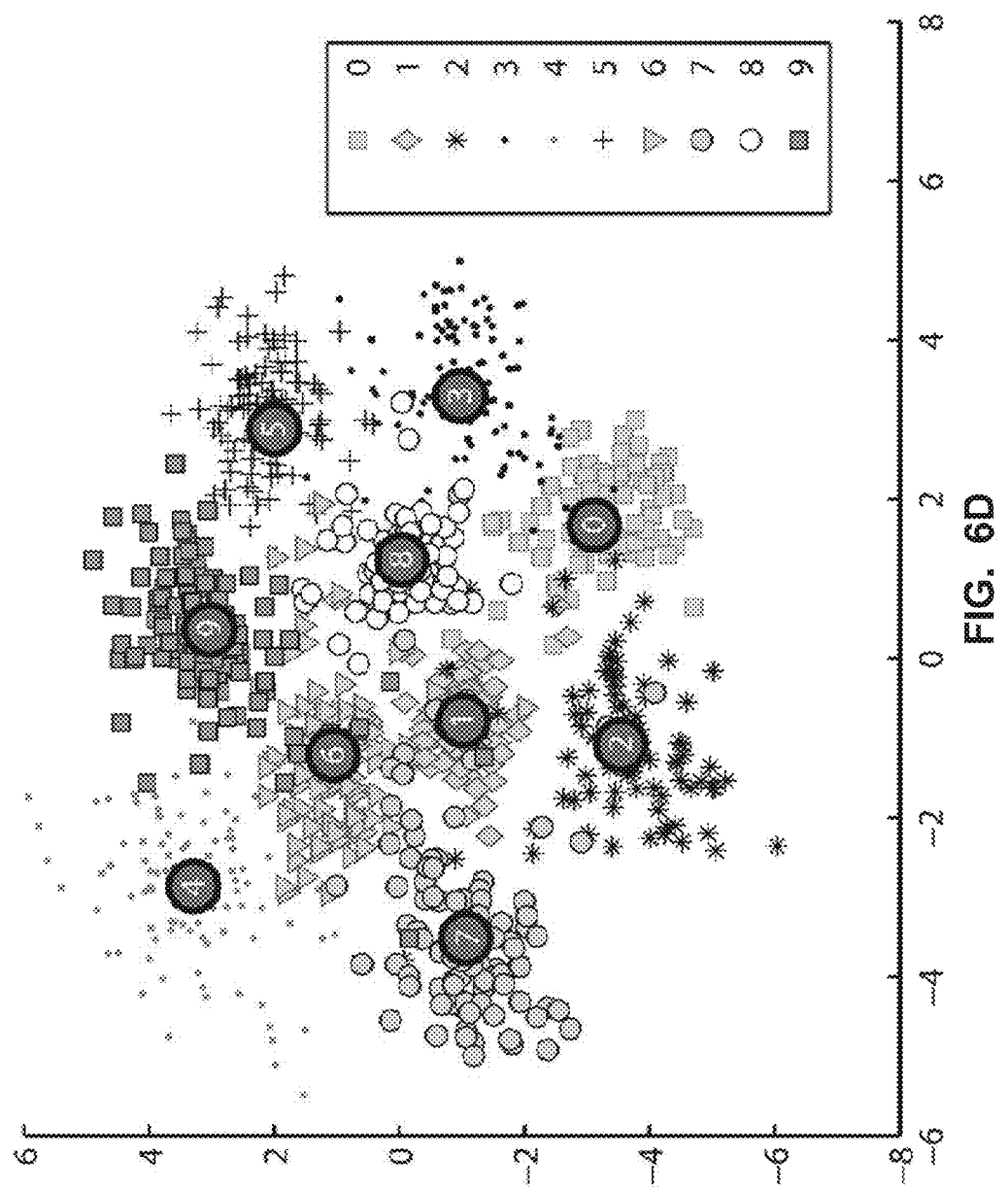
FIG. 6D illustrates compressed 50D representations plotted in two dimensions for the tasks of FIGS. 6A to 6C.

Referring now to FIG. 6D, there are illustrated compressed 50D representations plotted in two dimensions using dimensionality reduction, which allows visualization of a 50-dimensional space in just two dimensions. Items that are "near" each other in the 50-dimensional space will also appear near each other in the two-dimensional representation. It can be observed that the semantic pointers are generally clustered together according to the numeral depicted in the input image. Large dark circles are used to indicate the mean value of the semantic pointers for each category.

In the example system 300 of FIG. 3B, a simulated control arm is controlled via motor output module 314. The simulated control arm is modeled to have at least one joint, and to exhibit inertia. Accordingly, the motor output module 314 must account for these factors when generating motor control output.

Motor output module 314 is implemented using a motor hierarchy. Generally, the motor hierarchy, as with other hierarchies, can have an arbitrary number of levels. In the example embodiment, the motor hierarchy has a first-level controller that determines control commands and a second level in the hierarchy that projects the commands to a joint angle space. The first-level controller can optimize within its workspace—where the workspace is the 2-D space the arm moves in (e.g., a sheet of paper)—for one or more functions to, for example, use as little energy as possible, minimize path length, etc.

This model of the motor hierarchy has been shown to account for the behavioral effects of a variety of motor system disturbances, including Huntington's disease, Parkinson's disease and cerebellar damage. In addition, it has been shown to qualitatively reproduce the dynamics of spiking neurons observed in monkey cortex during similar reaching tasks.

In the example embodiment, the first level in the hierarchy operates in a two-dimensional space, and a three dimensional semantic space is used in the second level. All movements are planned in three dimensions (e.g., a two-dimensional plane with timing component) in the second level, and then projected to a higher-D space of the arm where degrees of freedom (i.e. dimensionality) can be determined by, for example, the number of muscles available to control the arm.

In the example embodiment, the motor hierarchy is preconfigured and not trained. However, in other embodiments, a neural network may be trained to perform the motor output function.

Figure 7A:
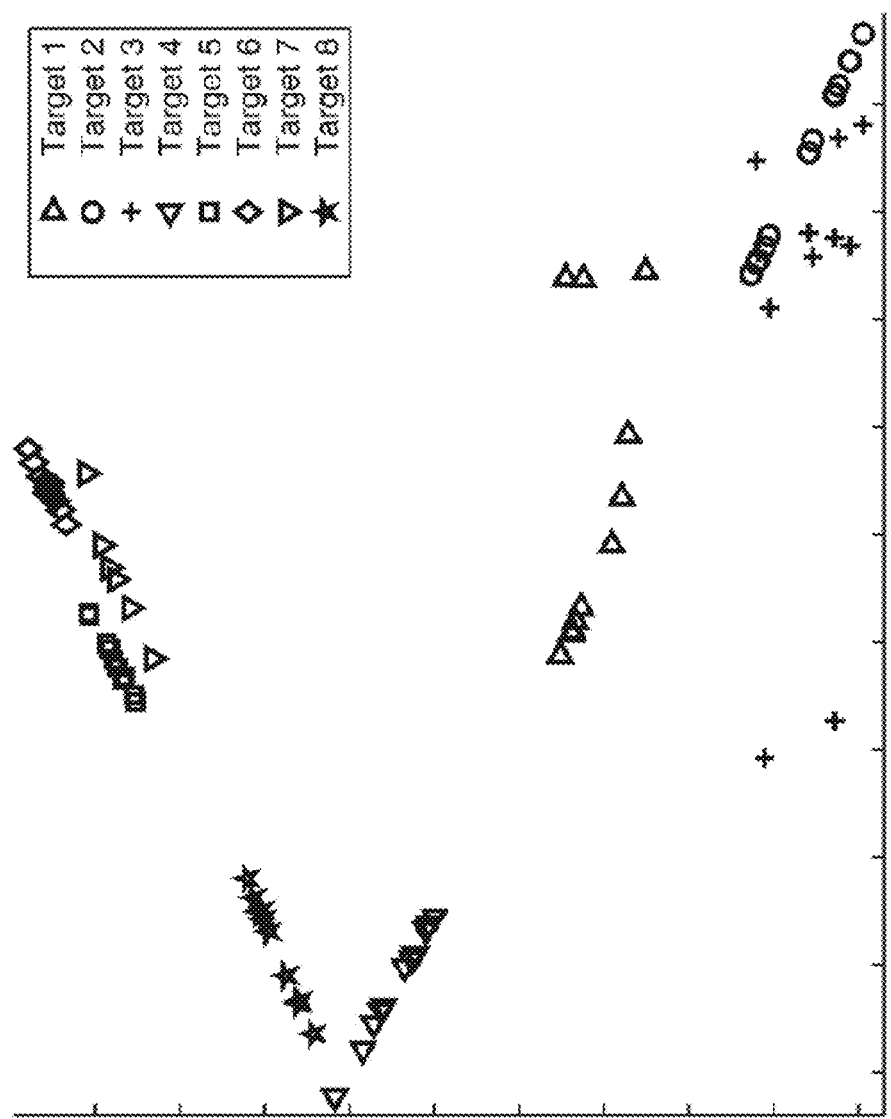
FIG. 7A illustrates the clustering of 6-dimensional (6D) control signals used to drive the movements illustrated in FIG. 7B.
Figure 7B:
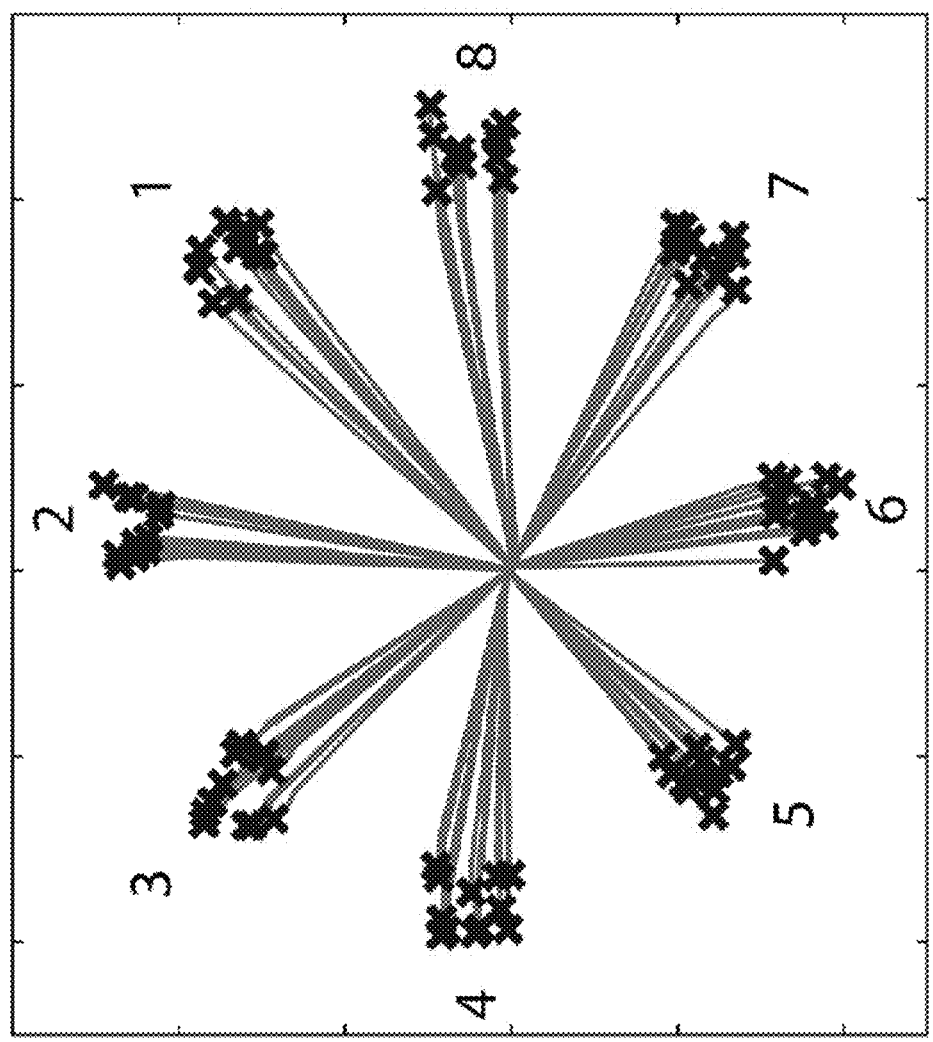
FIG. 7B illustrates the movements of a simulated arm when driven by eight different semantic pointers.

Referring now to FIGS. 7A and 7B, there is illustrated a semantic motor space demonstrating how similar high-level semantic pointers can generate similar low-level movements. In particular, FIG. 7A shows the clustering of 6-dimensional (6D) control signals used to drive the movements illustrated in FIG. 7B. FIG. 7B illustrates the movements of the simulated arm when driven by eight different semantic pointers, that latter of which are illustrated as the 2D coordinates of the target. Targets 1 through 8 are numbered. It is clear that there is not a simple mapping between movement in 2D and the control command the 6D space. Nevertheless, the dereferencing of the 6D semantic pointers drives the high-dimensional system consistently in external 2D space as seen in FIG. 7B. The variability is due to noise, which is included in the model intentionally to demonstrate robustness.

In the example system 300 of FIG. 3B, the working memory hierarchy module 316 is a central element. Working memory module 316 consists of several distinct memory systems, each of which can store semantic pointers. Some employ compression and some do not, but in example system 300 both types have been grouped into a single subsystem for simplicity. All are recurrent attractor neural networks, covering a range of dimensionalities. High-dimensional circuits are used for storing and manipulating semantic pointers. Those networks that employ compression (i.e., directly construct and decode semantic pointers) use circular convolution to perform compression. This is an example of a predefined compression operator for generating semantic pointers (this operator can also be learned in a spiking network). This operator compressively binds two vectors together. Consequently, serial memories can be constructed by binding the semantic pointer of the current input with its appropriate position, for example as follows:

$$\text{Memory Trace} = P1 \otimes \text{Item } 1 + P2 \otimes \text{Item } 2 + \ldots$$

where Item semantic pointers are the semantic pointers to be stored, and Position (Pn) semantic pointers are internally generated position index semantic pointers.

Position indices can be generated using semantic pointers. In particular, random unitary base semantic pointers, Base, may be used, where the next position index is generated by successive convolution, for example:

$$P1 = \text{Base}$$

$$P2 = P1 \otimes \text{Base}$$

$$P3 = P2 \otimes \text{Base}$$

etc.

This allows for the generation of as many positions as needed to encode a given list. A unitary vector is one that does not change length when it is convolved with itself.

An overall memory trace is a sum of this encoding through two memory pathways, which have different decay dynamics.

Additional compression operators that may be used include binary XOR or element-wise multiplication, principle component extraction, and learned operators, for example. It will be appreciated that other compression operators may also be used. In general, compression operators allow semantic pointer representations (vectors) to be combined into new representations through a combination of a compression operator and a superposition.

Figure 8A:
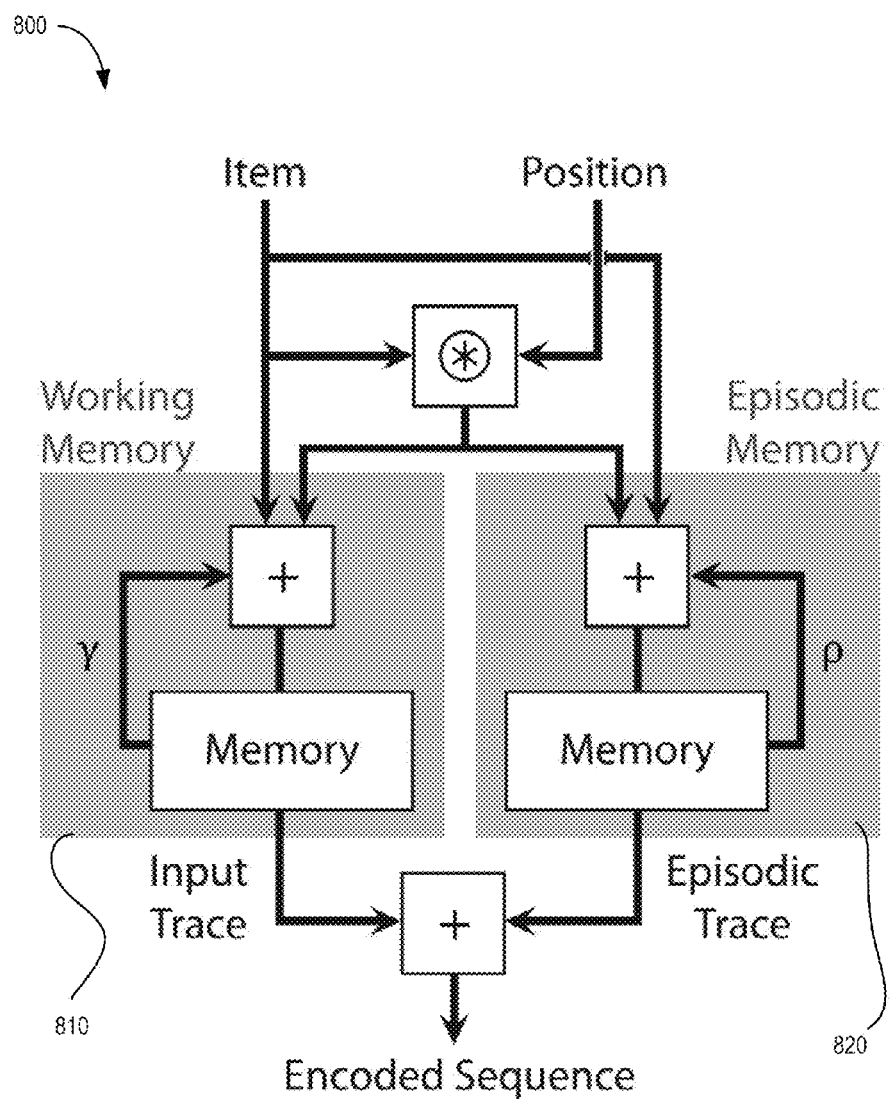
FIGS. 8A and 8B are schematic diagrams for carrying out example compression operators used to bind, encode and decode semantic pointers in working memory.
Figure 8B:
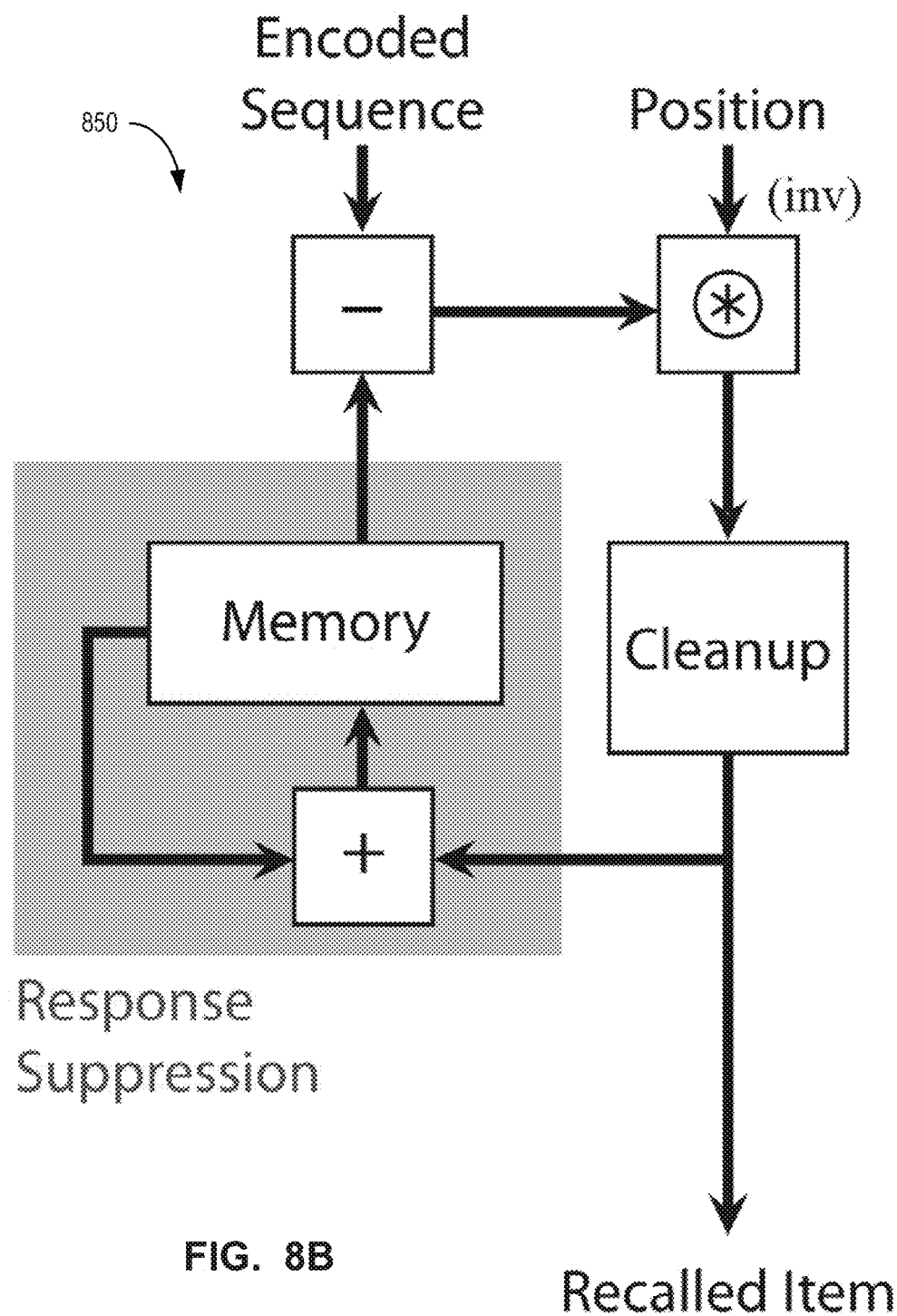

Referring now to FIGS. 8A and 8B, there are illustrated example compression operators used to bind, encode and decode semantic pointers in working memory.

FIG. 8A illustrates a network level diagram of a memory encoding network 800, whereas FIG. 8B illustrates an item recall network 850.

The encoding network 800 receives an item semantic pointer and position semantic pointer as inputs. These are bound through compression and sent to a working memory subsystem 810 and an episodic memory subsystem 820, along with the item semantic pointer itself. The inputs are added to the current memory state in each memory subsystem. Each memory subsystem thus stores the information by integrating it over time, although the decay rates ($\gamma$ and $\rho$) are different for the two memories.

The decoding network 850 receives the originally encoded memory semantic pointer, and the position semantic pointer, as input and decodes originally encoded memory by unbinding the appropriate position. The result is cleaned up and placed in a memory that tracks already-recalled items. The contents of the already-recalled memory is subtracted from the originally encoded sequence before any additional items are recalled, in order to suppress already-recalled items.

Cleanup here refers to recognizing the states of a neural network, which may have inherent noisiness. Cleanup can be performed as described, for example, by T. C. Stewart, Y. Tang, C. Eliasmith, "A Biologically Realistic Cleanup Memory: Autoassociation in Spiking Neurons", *Cognitive Systems Research*, vol. 12, no. 2, pp. 84-92 (2011), the entire contents of which are incorporated herein by reference.

Referring again to the example system 300 of FIG. 3B, the information encoding module 304 generally maps semantic pointers generated from images by the visual input hierarchy 302 to conceptual semantic pointers that encode the concepts of sequences and progression relationships. Progression relationships are a basic, but powerful concept and so this information encoding is used for most tasks in the example system 300, except a copy drawing task (in the copy drawing task it is the visual features of the input, not the conceptual properties of the input, that matter for successful completion of the task).

The conceptual semantic pointers for numbers are constructed in a similar manner to those for position. That is, $$\text{One} = \text{Base}$$

$$\text{Two} = \text{One} \otimes \text{AddOne}$$

$$\text{Three} = \text{Two} \otimes \text{AddOne}$$

etc.

Base and AddOne are random unitary semantic pointers. Anatomically, this mapping is likely implemented in later parts of the ventral visual stream such as the anterior inferior temporal cortex.

In system 300, information encoding module 304 is implemented as a single-level neural network.

Transformation calculation module 306 is implemented in system 300 as a recurrent attractor network similar to the working memory elements, with an input transformation. Generally, module 306 computes a transformation between its inputs and stores a running average of the result. As a result, this running average represents the inferred relation that exists between all of the inputs it is shown. This subsystem is important for the Raven's Progressive Matrices (RPM) cognitive test and rapid variable creation tasks. For example, given syntactic input/output patterns (e.g., 0 0 7 4→7 4; 0 0 2 4→2 4; etc.), the transformation calculation module 306 determines and applies a transformation to provide a novel pattern given only the input (e.g., 0 0 1 4) to produce a transformation result (e.g., 1 4). In another example, transformation calculation module 306 can determine and apply a transformation given a syntactic or semantic reasoning task. For example, one such task is a pattern completion task, such as completing patterns of the form: [1 2 3; 5 6 7; 3 4?].

Reward evaluation module 308 generally processes an input semantic pointer and can determine a reward associated with the current input in the current context. Rewards may be positive or negative. Rewards may be absent in many cases, or may be simply ignored. In an example implementation, this means that during a reinforcement learning task, if a '1' image is shown after a guess by system 300, a positive reward signal is generated and sent to the ventral striatum. If the reward was unpredicted, the positive reward signal is also sent to a reward system in the action selection controller 318 (which is modeled after the basal ganglia). All further reward processing can be done in the basal ganglia. This mapping from visual input to reward is consistent with the function of orbitofrontal cortex involvement in human corticostriatal loops demonstrated in the art.

In an example embodiment, rewards may be stochastically-generated and input via an external reward signal. For example, if a "1" character is shown to system 300 after an output from system 300, system 300 may interpret the "1" as a reward.

Information decoding module 310 is generally used to extract semantic pointers useful for motor control from the working memory hierarchy. That is, when information is encoded in memory trace form, specific items must be extracted using decompression so that they can be used to drive behavior. For example, given a memory trace $V=P1 \otimes 3+P2 \otimes 5$, decoding may be performed by the decompression operation $V \otimes P2'$ (where $P2'$ is the inverse of P2) to identify what is at position P2. In this example, the result of the decompression operation would be about 5, which can be cleaned up to 5. In general, any semantic pointer that can be encoded as described herein can also be decoded in a corresponding operation.

Motor processing module 312 typically receives semantic pointers output from information decoding module 310 and processes the semantic pointers for output to the motor output hierarchy 314 (e.g., for driving the simulated arm). In particular, motor processing module 312 assists in timing the presentation of decoded output to ensure that recently sent motor commands are completed before new ones are presented.

Action selection controller 318 is generally modeled on the mammalian basal ganglia. As such, action selection controller 318 monitors all modules within system 300, determines pattern matches and determines actions to take accordingly. Action selection controller 318 generally operates on high-dimensional semantic pointers. The semantic pointers are filtered through connections into the controller 318 that determine the value of possible actions. Action selection controller 318 is also capable of taking into account the timing of pattern matches.

Controller 318 selects the highest valued action and changes the communication paths between elements of system 300 to put the model into a state that is relevant and suited for solving the currently selected task. The communication paths can be controlled by regulating control points 350, 352, 354, 356, 358 and 360. In particular, by modulating a selected control point, a corresponding module can be "activated", that is it receives relevant semantic pointers to process. For example, if control point 350 is enabled and the remaining control points 352, 354, 356, 358 and 360 are disabled, then only the information output from encoding module 304 is passed on to working memory 316—all of the other pathways are inhibited.

Depending on the inputs to action selection controller, the controller can select one or more modules, none at all, or partially select a one or more modules by variably modulating control points for the selected modules. Variable modulation can be carried out by reducing firing activity for the selected neurons, which is a common occurrence in biological systems. This ability to partially select is generally not found in conventional action selection systems, because in purely symbolic models it is very difficult to identify what "partially" selecting an action should mean, or what selecting two actions at once should mean. Accordingly, the ability to partially select modules may be provided in some embodiments, although it need not be.

Figure 9:
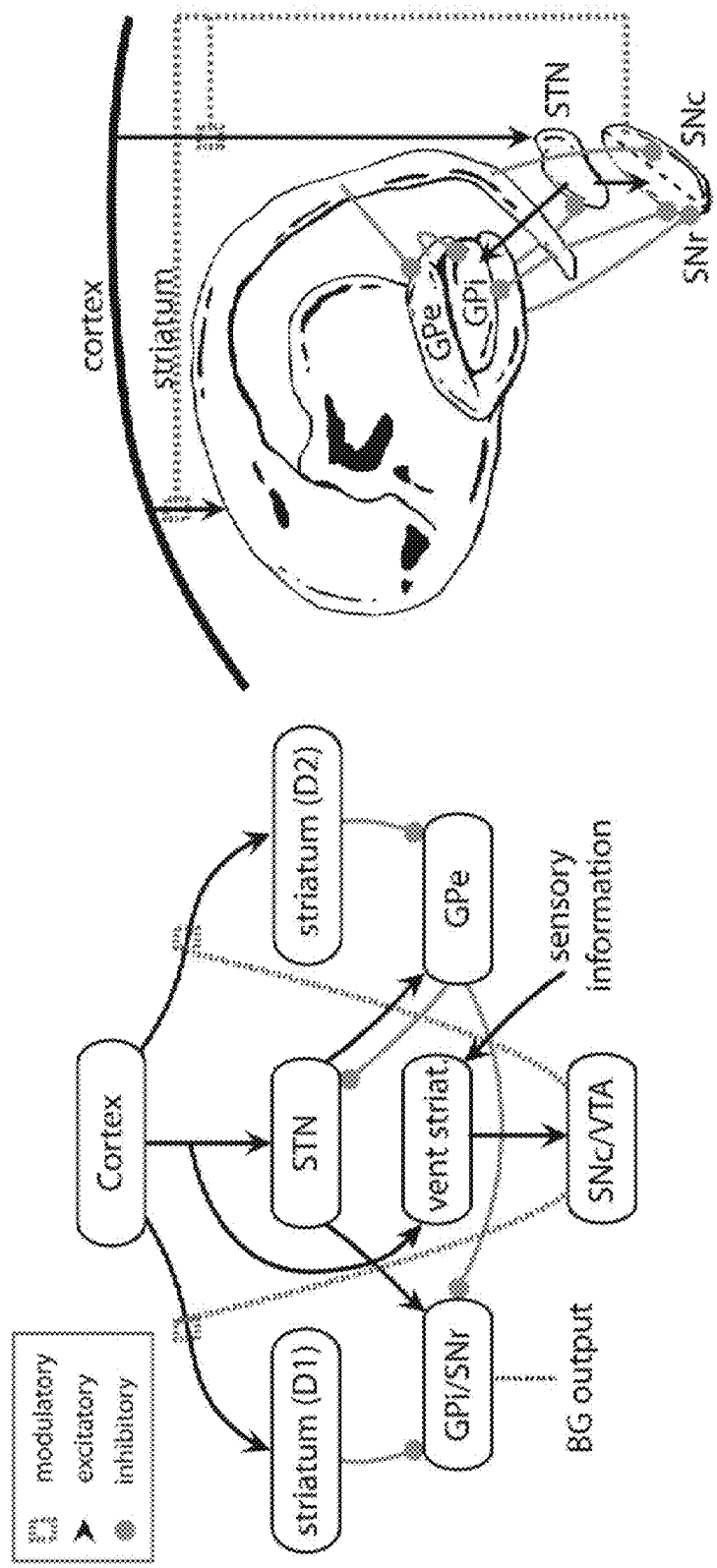
FIG. 9 illustrates an example functional schematic block diagram for an action selection controller.

Referring now to FIG. 9, there is illustrated a schematic block diagram of the internal structure which may be used as a basis for configuring action selection controller 318. Action selection controller 318 is generally modeled on the mammalian basal ganglia, with dopaminergic projections and ventral striatum also modeled. The substantia-nigra-pars-compacta (SNc) and ventral tegmental area (VTA), which both contain efferent dopamine neurons, are also modeled.

Modulatory dopamine connections ("modulatory reward connections") are also modeled and shown as dotted lines. These generally carry information about reward prediction error based on current sensory information.

The ventral striatum is modeled as it encodes values for current and previous states, as well as the current immediate reward. This information is then processed through a modeled SNc/VTA network to generate the prediction error that is encoded in the modulatory reward signal.

Other elements of the action selection controller include the direct and hyper-direct pathways. Different actions that have different "values" indicated by the inputs to the striatum and STN from the other modules of system 300.

In this particular model, for biological realism, "selecting" an action in action selection controller 318—as in mammalian basal ganglia—corresponds to inhibiting the corresponding output. That is, the GPi output should be low for the selected action, but high for all other actions. The equally weighted inhibitory connections in the direct pathway cause the most active input to most greatly suppress the action to be selected. However, if not for the additional excitation provided by the STN, all of the actions might be concurrently suppressed (meaning more than one action had been selected). The very broad STN connections thus take the input from the hyper-direct pathway, and combine it to provide a level of background excitation that allows only the most inhibited action to be selected.

In an example implementation, system 300 has been demonstrated to perform eight different tasks using the same system, without external human intervention or guidance.

All inputs to the system 300 in the example tasks are 28 by 28 images of handwritten or typed characters. All outputs are the movements of a physically modeled arm that has mass, length, inertia, etc. Many of the tasks chosen are the subject of extensive modeling in their own right (e.g., image recognition, serial working memory (WM) and reinforcement learning (RL)), while others demonstrate abilities that are rare for neural network research and have not yet been demonstrated in spiking networks (e.g., counting, question answering, rapid variable creation, and fluid reasoning).

However, while system 300 is configured to provide these eight tasks, it need not be limited to these specific tasks. The flexible, non-task-specific nature of each hierarchy module and subsystem allows for a wide variety of other tasks to be performed using the same modules and subsystems. Moreover, additional modules and subsystems can be introduced to augment the abilities of system 300.

In the example embodiment, the eight tasks (termed "A0" to "A7") that system 300 is given to perform are:
  (A0) Copy drawing—Given a randomly chosen handwritten digit, produce the same digit written in the same style as the handwriting;
  (A1) Image recognition—Given a randomly chosen handwritten digit, produce the same digit written in its default writing;
  (A2) Reinforcement learning—Perform a three-armed bandit task, in which it is determined which of three possible choices generates the greatest stochastically generated reward. Reward contingencies can change from trial to trial
  (A3) Serial working memory (WM)—Given a list of any length, reproduce it;
  (A4) Counting—Given a starting value and a count value, write the final value (that is, the sum of the two values);
  (A5) Question answering—Given a list of numbers, answer either one of two possible questions: (i) what is in a given position in the list? (a "P" question) or (ii) given a kind of number, at what position is this number in the list? (a "K" question);
  (A6) Rapid variable creation—Given example syntactic input/output patterns (e.g., 0 0 7 4→7 4; 0 0 2 4→2 4; etc.), complete a novel pattern given only the input (e.g., 0 0 1 4→?); and
  (A7) Fluid reasoning—Perform a syntactic or semantic reasoning task, such as a pattern completion task of the form: [123; 567; 34?].

Each input image is shown for 150 ms and separated by a 150 ms blank input. The system 300 is told what the task will be by showing it an "A" and the number of the task (0 to 7). The system is then shown input defining the task. Working demonstrations have shown system 300 to be robust to invalid input and to perform tasks in any order without operator intervention. Source code for implementing an example embodiment, such as system 300, and the described example tasks can be obtained at the URL <http://models.nengo.ca/spaun>.

Because the various elements of system 300 are not task-specific, they can be used in a variety of combinations to perform the above-identified tasks, resulting in the same circuitry being used across tasks. This also makes it straightforward to extend the system 300 to perform new tasks. In general, the described systems and methods are capable of carrying out tasks that involve receiving input, for example in the form of internal or external stimuli, manipulating one or more internal states or representations of the input, and producing an output, where output can be the end result of the task or an intermediary step. For example, output may be in the form of one or more actions or decisions. In some cases, the system may be configured to carry out tasks as a way of maximizing a real or perceived reward, although this need not be the case.

Figure 4A:
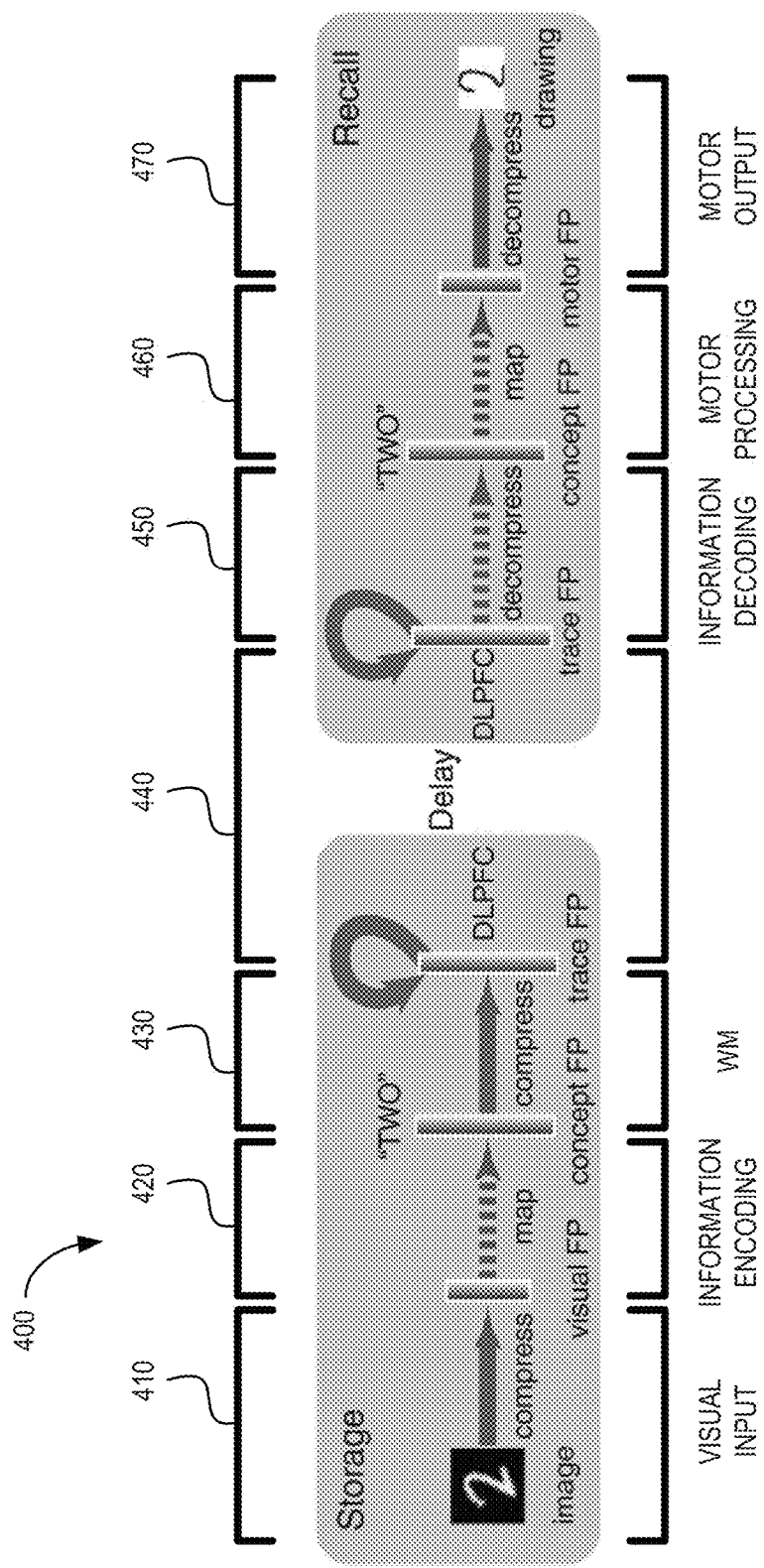
FIG. 4A is a data flow diagram illustrating a serial working memory task.
Figure 4B:
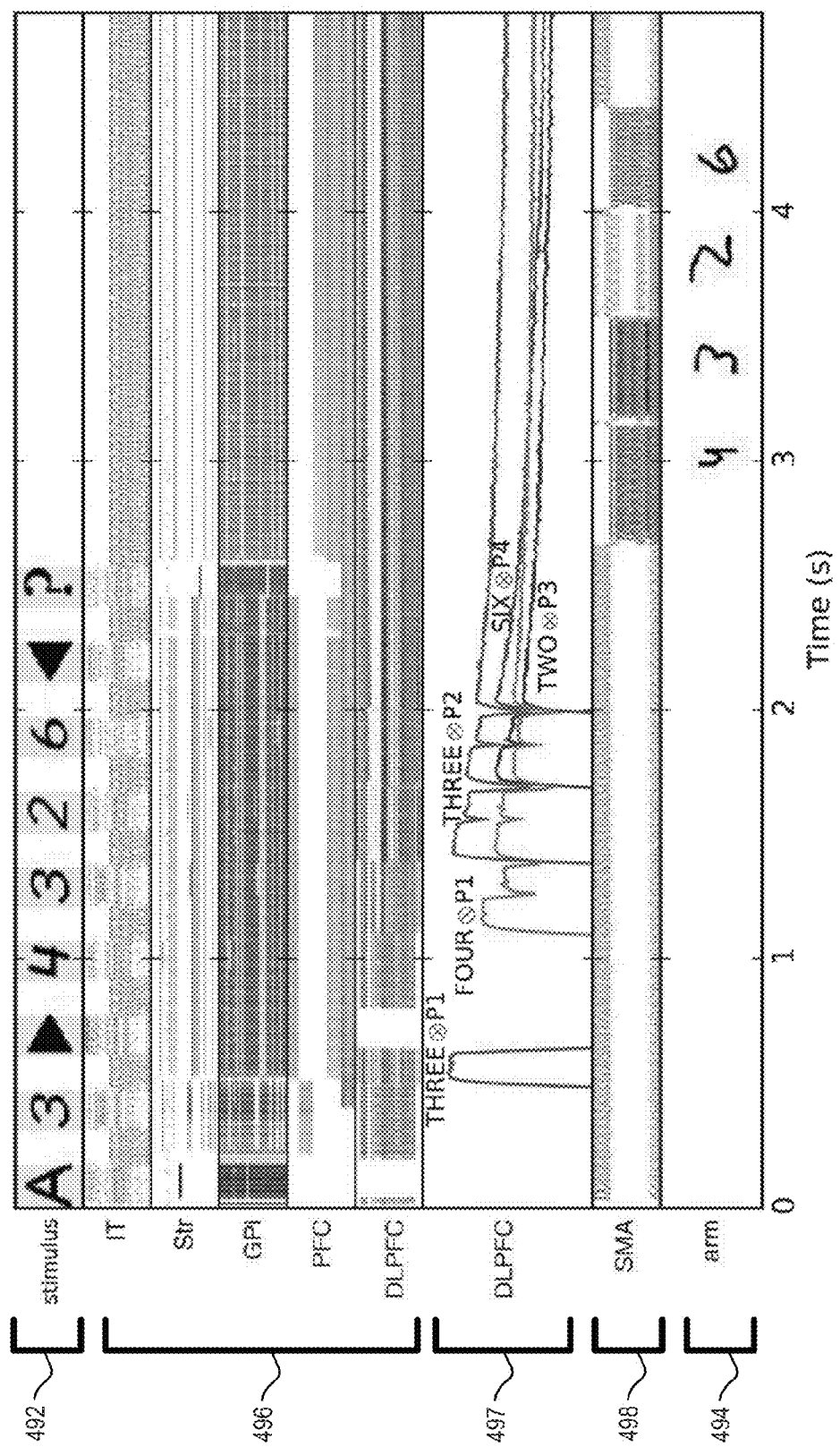
FIG. 4B illustrates a time course of a single run of the task of FIG. 4A.

Referring now to FIGS. 4A and 4B, there is illustrated a serial working memory task (A3). FIG. 4A is a data flow diagram for the serial working memory task, illustrating the information flow through system 300 during the serial working memory (WM) task.

Initially, seeing a task identifier (A3) switches system 300 into the storage state.

The task begins at 410 with the input of an image, in this case the numeral "2", to visual input hierarchy 302. Visual input hierarchy 302 compresses the initial image representation to generate a visually based firing pattern (FP), a lower-dimensional semantic pointer, that encodes visual features of the input image.

At 420, the semantic pointer generated at 410 is communicated to information encoding module 304, which maps the input semantic pointer or firing pattern to one that represents the related concept: in this case the concept of a numeral with a value "two" as differentiated from "zero", "one" or other numerals.

At 430, the conceptual semantic pointer is communicated and stored in working memory 316 in a memory trace. The compression operator (i.e., "⊗ ") binds the concept semantic pointer (e.g., TWO) to a position representation (e.g., P3) and adds the result (i.e., TWO⊗P3) to the working memory.

Since recall may not be needed immediately, a delay elapses at 440, during which time the working memory 316 retains the stored conceptual semantic pointer in a sequence position. The sequence may be extended as described herein, as additional semantic pointers are recognized and stored, prior to recall being needed. This process may be repeated as long as input images are shown to the system.

Once recall is needed, the conceptual semantic pointer is identified and extracted from working memory by information decoding module 310 at 450. The semantic pointer is communicated to motor processing module 312.

Recall generally consists of decompressing an item from the stored representation of the full list, mapping the resulting concept vector to a known high-level motor command, and then decompressing that motor command to specific joint torques to move the arm. This process is repeated for each position in the WM, to generate the system's full written response.

At 460, motor processing module 312 maps the conceptual semantic pointer for "two" to one or more motor command semantic pointers with timing necessary to draw the correct output.

Finally, at 470, the motor semantic pointers are received by motor output 314, which decompresses the command semantic pointers into the specific sequence of muscle commands needed to draw the character using the simulated arm.

FIG. 4B illustrates a time course of a single run of the serial WM task.

A stimulus row 492 shows the sequence of input images shown to system 300.

The arm row 494 shows the sequence of digits drawn by the simulated arm of system 300.

Rows 496 and 498 are raster plots illustrating spiking activity for neurons in the respective structures labeled by their corresponding anatomical area. For example, row IT illustrates spiking over time in the fourth hierarchical level of the visual input hierarchy. Raster plots are generated by randomly selecting 2000 neurons from the relevant population and discarding any neurons with a variance of less than 10% over the run.

Similarity plots in row 497 show the dot product (i.e., similarity) between the decoded representation from the DLPFC spike raster plot and concepts in the vocabulary of system 300. These plots provide a conceptual decoding of the spiking activity in a symbol-based language to indicate how the system is "thinking" and "remembering" internally.

Figure 10A:
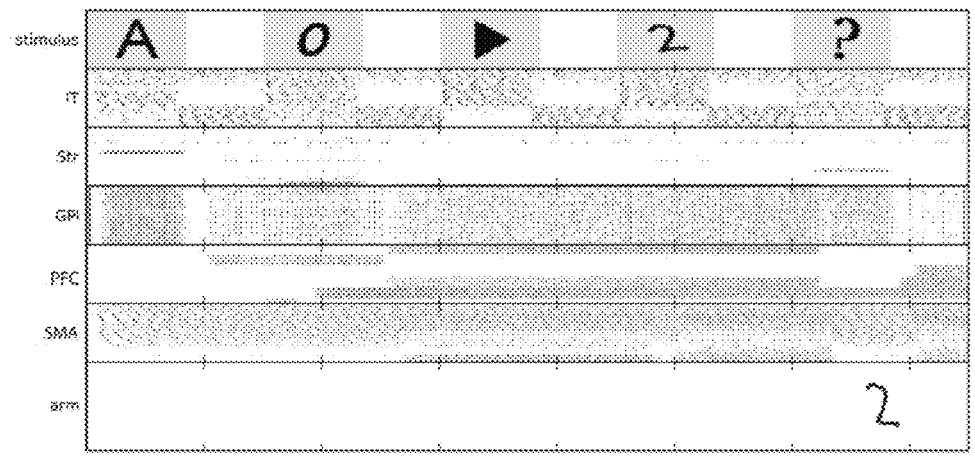
FIG. 10A illustrates the performance of an example system in a low-level perceptual-motor task.
Figure 10B:
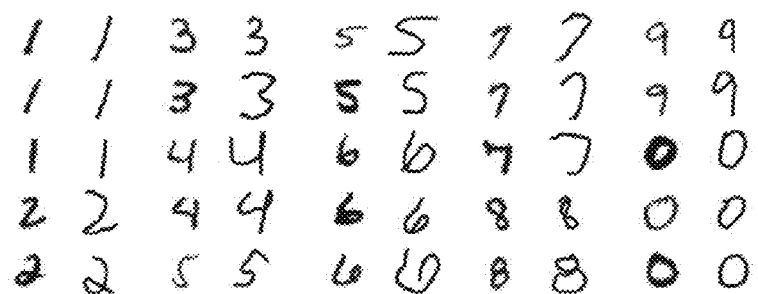
FIG. 10B illustrates example pairs of inputs and outputs for the copy drawing task illustrated in FIG. 10A.

No single task demonstrates all distinct features of system 300. For example, FIG. 10A illustrates the performance of system 300 in a low-level perceptual-motor task, the copy-drawing task, for a numeral two (2). FIG. 10B illustrates example pairs of inputs and outputs for the copy drawing task as carried out by system 300. It can be observed that low-level visual features (e.g., straight vs. looped bottoms, slant, stroke length, etc.) of the examples are approximately reproduced by the system.

Figure 11A:
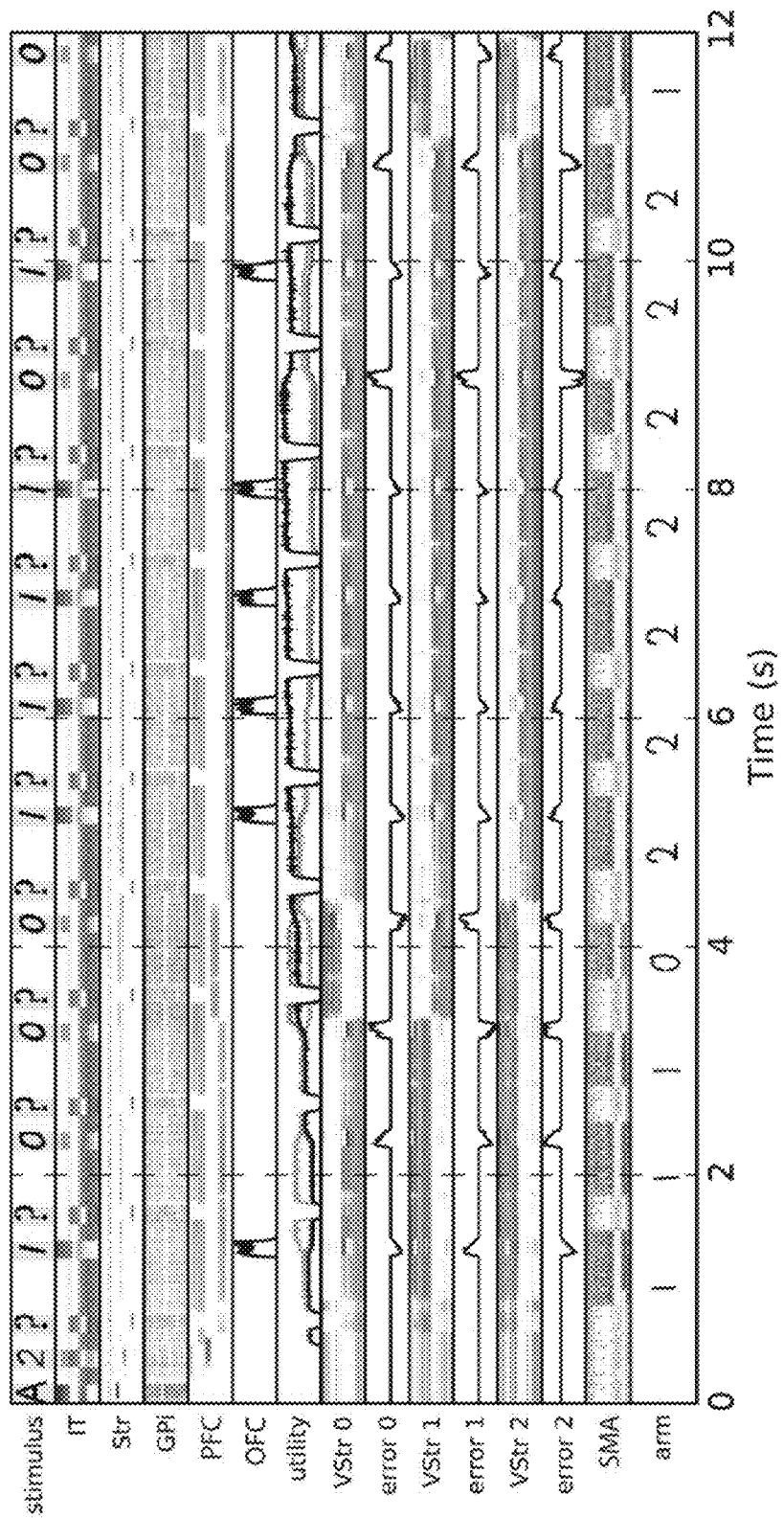
FIG. 11A illustrates the reward and behavioral time course of an example system in a reinforcement learning task.

FIG. 11A illustrates the reward and behavioral time course of system 300 in a reinforcement learning task. In the illustrated example, the task is a three-armed bandit task. Here the best action was to draw a "2". After some incorrect guesses, this contingency is learned by the model at the beginning of the task. However, it can be observed that two "unlucky" rewards at the end of the trial (at 9 s and 11 s) cause the "utility" trace (a decoding of the Str activity) to decrease, and hence the system chooses a "1" for its next guess. The reward prediction error signal is shown separately for each of the three possible actions (this can also be thought of as a reward vector, which is the decoding of a subset of vStr activity). As can be seen, "error 2" decreases as the trial proceeds, until the unlucky rewards occur.

Figure 11B:
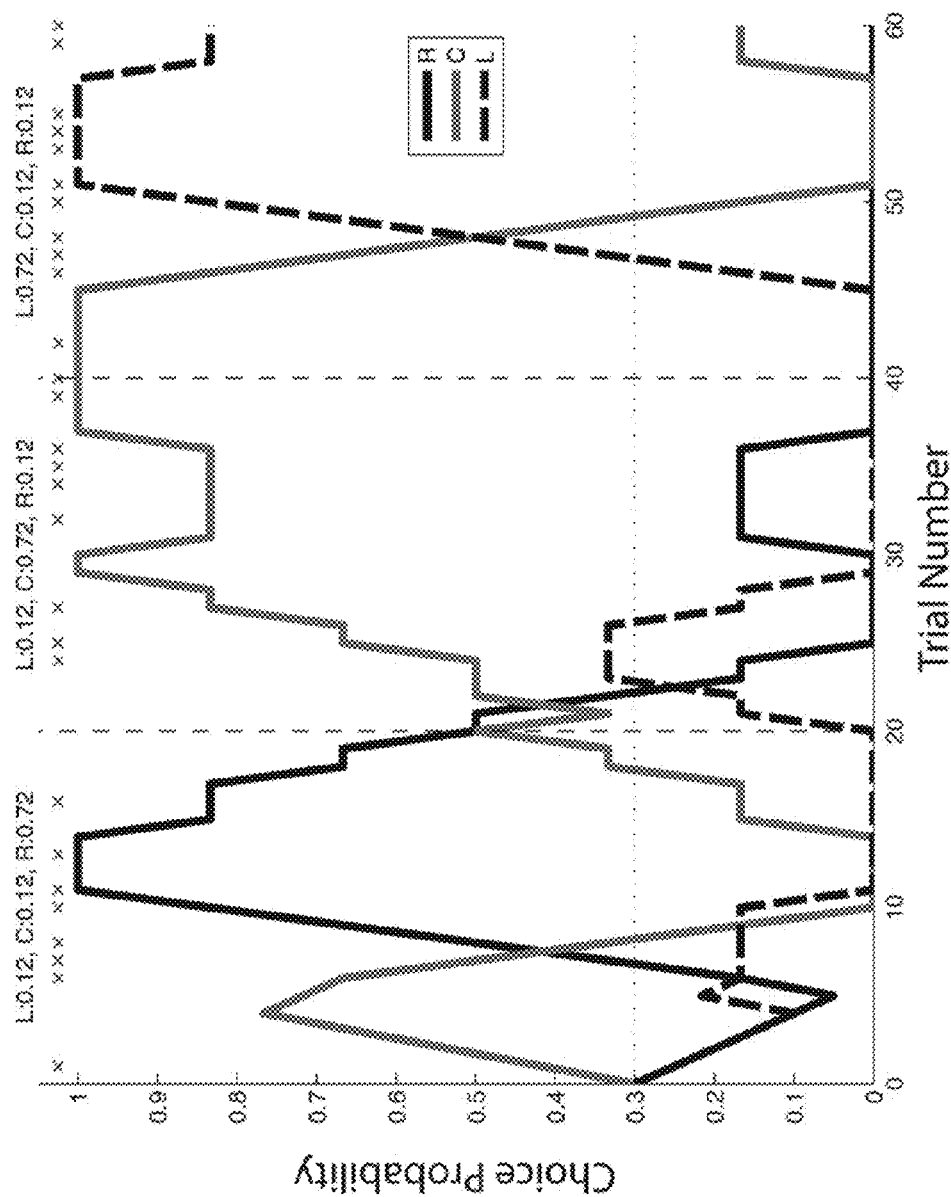
FIG. 11B illustrates the results of a behavioral run of 60 trials for the task of FIG. 11A.

Referring now to FIG. 11B, there is illustrated the results of a behavioral run of 60 trials for the three-armed bandit task of FIG. 11A. Every 20 trials, the probability of reward for the three choices changes, as indicated at the top of the graph. The probability of choosing each action is indicated by the contiguous lines. These probabilities are generated by averaging over a 5-trial window. Positive reward delivery during the run is indicated by the 'x' marks along the top of the graph. Trials not marked with an 'x' resulted in negative reward delivery.

Figure 12A:
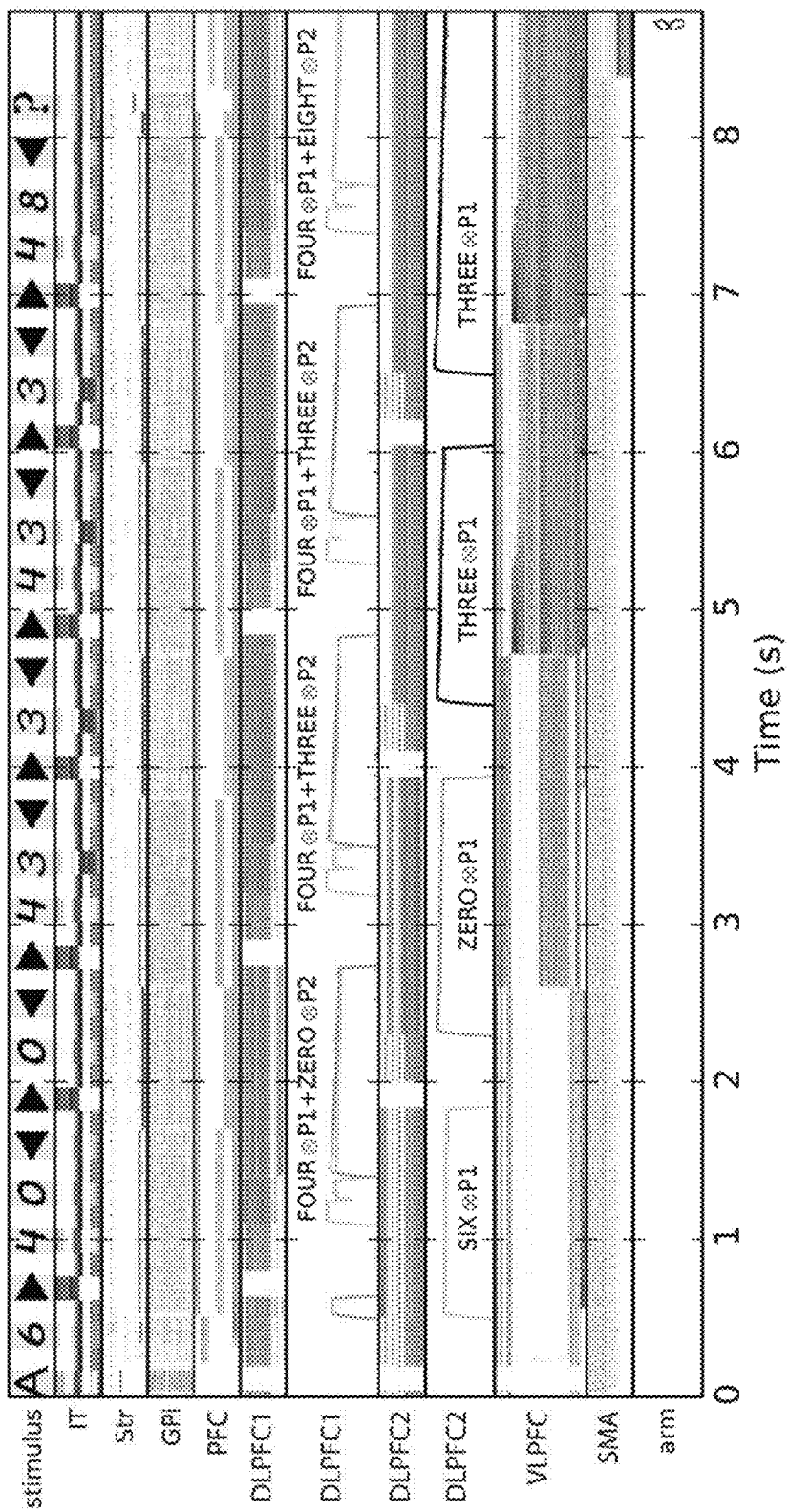
FIGS. 12A and 12B illustrate the performance of an example system in two rapid variable creation tasks.
Figure 12B:
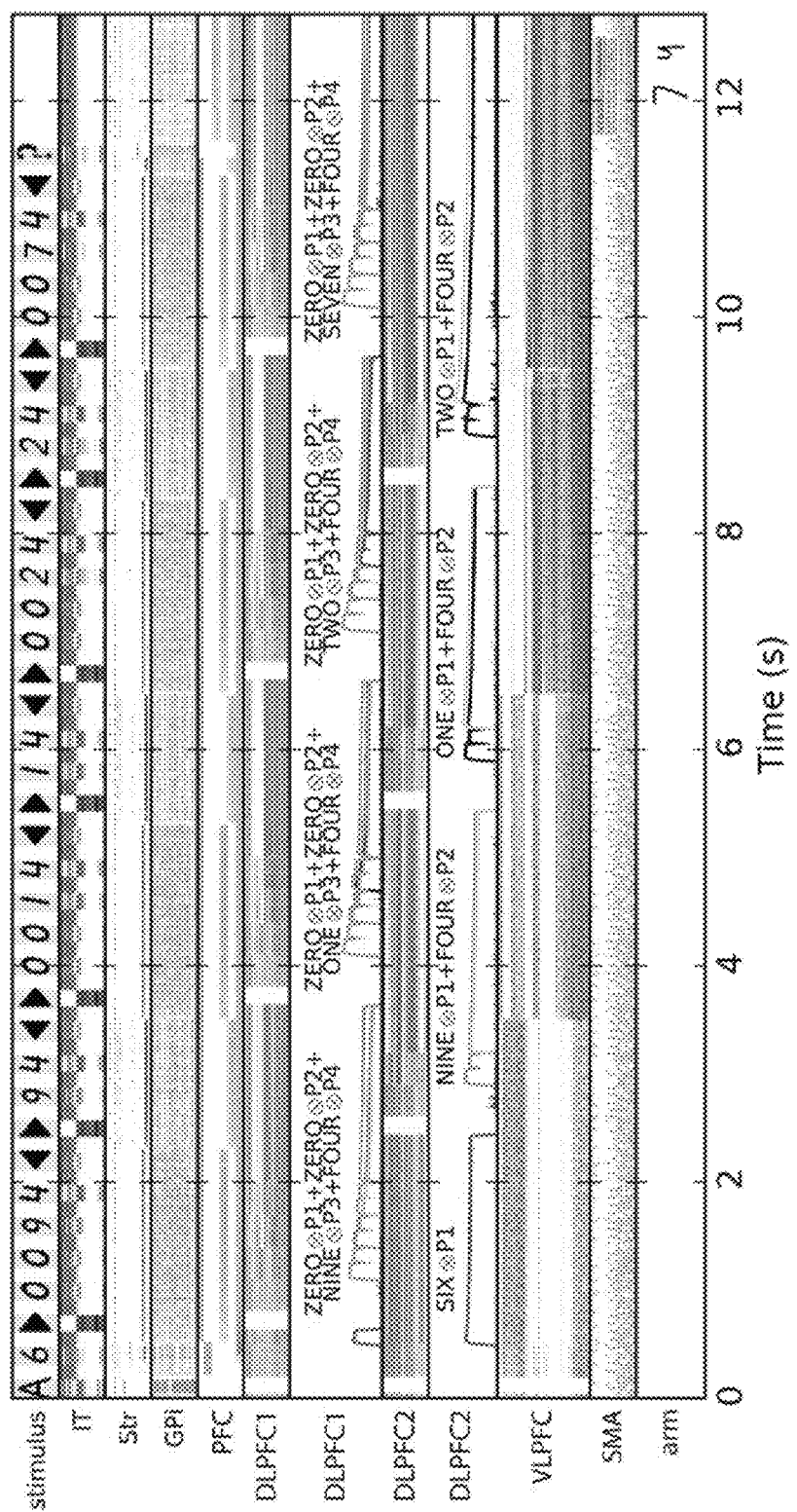

FIGS. 12A and 12B illustrate the performance of system 300 in two rapid variable creation tasks. In the rapid variable creation task, a stimulus is provided in the form of a set of input/output pairs, in which some elements are variables and some are constant or ignored. There can be any number of input/output pairs of any length. In FIGS. 12A and 12B, DLPFC1 illustrates the encoding of the example input, DLPFC2 illustrates encoding of the corresponding example output. VLPCF illustrates a running estimate of the induced transformation between input and output given the examples.

Figure 13:
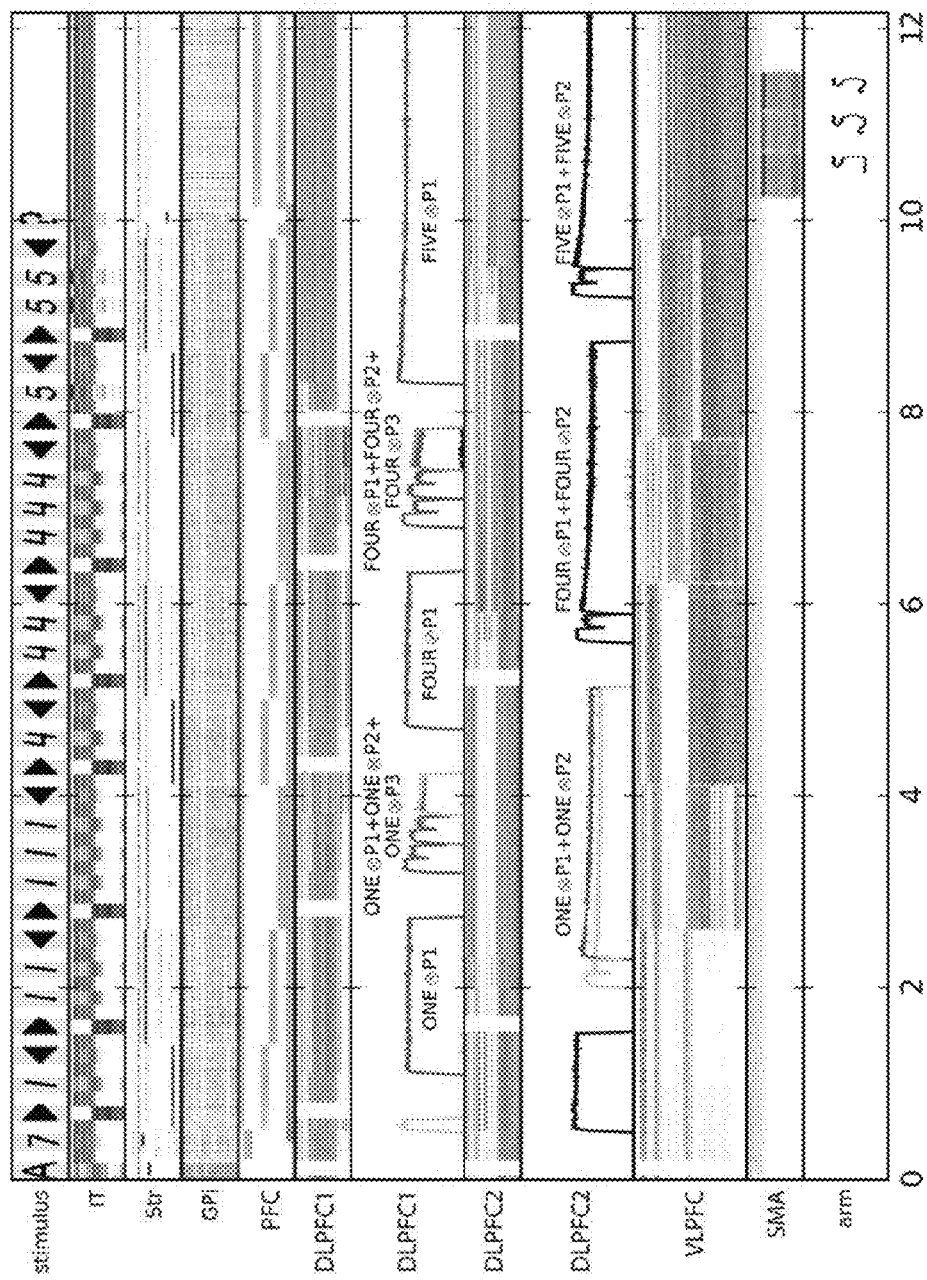
FIG. 13 illustrates the performance of an example system in a fluid reasoning task.

FIG. 13 illustrates the performance of system 300 in a fluid reasoning task. The spiking activity encoding the currently inferred rule is shown in the VMPFC row. This is a running average of the inverse convolution (i.e., the inferred transformation) between representations in DLPFC1 and DLPFC2, as appropriate. The time course of the systems' activity can be observed, in which the system infers that the pattern in the input is "increase the number of elements by one" (see DLPFC2 row, for example).

Generally, the described methods, systems and apparatus may provide a neural architecture in which at least one perceptual system compresses its input in a feed-forward pass and/or decompresses input in a backwards pass; at least one motor system decompresses its input in a feed-forward pass and/or compresses input in a backwards pass; at least one cortical system that may exploit compression and decompression for information processing; and at least one central controller that monitors and coordinates other elements of the architecture.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein. The scope of the claims should not be limited by the preferred embodiments and examples, but should be given the broadest interpretation consistent with the description as a whole.

We claim:

1. An artificial intelligence system comprising:
   at least one interface hierarchy configured to receive an input of a high-dimensional representation and to compress the high-dimensional representation to generate a lower-dimensional representation of the input;
   at least one processing module configured to receive the lower-dimensional representation and to generate a further representation;
   at least one control point positioned in a communication path between the at least one interface hierarchy and the at least one processing module, each control point being modulatable between an enabled state in which data is permitted to flow through the control point and a disabled state in which data is inhibited from flowing through the control point; and
   an action selection controller configured to control communication of the lower-dimensional representation and the further representation between the at least one interface hierarchy and the at least one processing module by modulating the at least one control point.

2. The system of claim 1, wherein an additional interface hierarchy is configured to decompress the further representation to generate an additional high-dimensional representation, the additional high-dimensional representation usable to produce an output.

3. The system of claim 1, wherein the at least one interface hierarchy is implemented using a neural network.

4. The system of claim 3, wherein the neural network is a spiking neural network.

5. The system of claim 1, wherein the at least one processing module is implemented using a neural network.

6. The system of claim 5, wherein the neural network is a spiking neural network.

7. The system of claim 1, wherein the action selection controller is implemented using a neural network.

8. The system of claim 7, wherein the neural network is a spiking neural network.

9. The system of claim 1, wherein the at least one interface hierarchy comprises one or more modules selected from the list consisting of a visual input module, a working memory module and a motor output module.

10. The system of claim 1, wherein the at least one processing module comprises one or more modules selected from the list consisting of an information encoding module, a transform calculation module, a reward evaluation module, an information decoding module and a motor processing module.

11. The system of claim 1, wherein the action selection controller comprises one or more hierarchical processing networks.

12. The system of claim 11, wherein the one or more hierarchical processing networks have functions analogous to at least one anatomical structure of mammalian basal ganglia.

13. The system of claim 12, wherein the at least one anatomical structure is selected from the group consisting of striatum, subthalmic nucleus, ventral striatum, globus pallidus externus, globus pallidus internus, substantia nigra pars reticulate, substantia nigra pars compacta, and ventral tegmental area.

14. The system of claim 1, wherein at least one particular control point of the at least one control point is further modulatable to at least one intermediate state in which data is modified as it flows through that control point.

* * * * *